United States Patent
Sethi et al.

(10) Patent No.: US 12,292,781 B2
(45) Date of Patent: May 6, 2025

(54) METHOD AND SYSTEM FOR MANAGING POWER CONSUMPTION FOR DEVICES

(71) Applicant: Dell Products L.P., Round Rock, TX (US)

(72) Inventors: Parminder Singh Sethi, Ludhiana (IN); Lakshmi Saroja Nalam, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 16 days.

(21) Appl. No.: 18/304,923

(22) Filed: Apr. 21, 2023

(65) Prior Publication Data
US 2024/0353913 A1 Oct. 24, 2024

(51) Int. Cl.
| | | |
|---|---|---|
| *G06F 1/3287* | (2019.01) | |
| *G06F 1/3203* | (2019.01) | |
| *G06F 1/3206* | (2019.01) | |
| *G06F 1/3209* | (2019.01) | |
| *G06F 1/329* | (2019.01) | |
| *G06F 9/4401* | (2018.01) | |

(52) U.S. Cl.
CPC .......... *G06F 1/3287* (2013.01); *G06F 1/3206* (2013.01); *G06F 1/329* (2013.01); *G06F 1/3203* (2013.01); *G06F 1/3209* (2013.01); *G06F 9/4418* (2013.01)

(58) Field of Classification Search
CPC .... G06F 1/3203; G06F 1/3287; G06F 9/4418; G06F 1/3209; G06F 1/3206; G06F 1/329
USPC .......................................... 713/300, 320, 323
See application file for complete search history.

(56) References Cited

U.S. PATENT DOCUMENTS

| | | |
|---|---|---|
| 6,105,035 A | 8/2000 | Monge |
| 6,195,760 B1 | 2/2001 | Chung et al. |
| 6,393,480 B1 | 5/2002 | Qin |
| 7,251,745 B2 | 7/2007 | Koch et al. |
| 7,401,248 B2 | 7/2008 | Nakahara et al. |
| 7,525,749 B2 | 4/2009 | Maejima et al. |
| 7,590,981 B2 | 9/2009 | Gupta et al. |
| 8,078,448 B1 | 12/2011 | Wohlberg et al. |
| 8,364,799 B2 | 1/2013 | Sakai |
| 8,918,673 B1 | 12/2014 | Rangaiah et al. |
| 9,015,832 B1 | 4/2015 | Lachwani et al. |

(Continued)

OTHER PUBLICATIONS

Wu, Suzhen et al., "Proactive Data Migration for Improved Storage Availability in Large-Scale Data Centers", IEEE Transactions on Computers, vol. 64, No. 9, Sep. 2015, pp. 2637-2651 (Year: 2015).

*Primary Examiner* — Ji H Bae
(74) *Attorney, Agent, or Firm* — Chamberlain, Hrdlicka, White, Williams & Aughtry; Aly Z. Dossa

(57) ABSTRACT

A method for performing power management services for devices includes identifying, by a power manager, a power schedule generation event associated with devices; in response to identifying the power schedule generation event: identifying relationships between containers of the devices; generating a relationship matrix based on the identifying; obtaining network information associated with the containers; generating a prediction model using the relationship matrix and the network information; generating power schedules associated with the devices using the prediction model; and performing power management services for the devices based on the power schedule.

18 Claims, 13 Drawing Sheets

(56) References Cited

U.S. PATENT DOCUMENTS

| | | |
|---|---|---|
| 9,417,918 B2 | 8/2016 | Chin |
| 9,514,164 B1 | 12/2016 | Matic |
| 10,303,465 B1 | 5/2019 | Potter |
| 11,128,464 B1 | 9/2021 | Loladia |
| 11,392,402 B1 | 7/2022 | Carroll |
| 11,595,269 B1 | 2/2023 | Ghosh et al. |
| 11,846,918 B1 | 12/2023 | Mazur |
| 2003/0233230 A1 | 12/2003 | Ammicht |
| 2005/0216800 A1 | 9/2005 | Bicknell et al. |
| 2005/0257090 A1 | 11/2005 | Santos |
| 2005/0273633 A1* | 12/2005 | Wilcox .............. G06F 1/3203 713/300 |
| 2006/0129771 A1 | 6/2006 | Dasgupta et al. |
| 2007/0079170 A1 | 4/2007 | Zimmer et al. |
| 2007/0198524 A1 | 8/2007 | Branda et al. |
| 2007/0198968 A1 | 8/2007 | Shenfield |
| 2008/0222218 A1 | 9/2008 | Richards et al. |
| 2009/0307522 A1 | 12/2009 | Olson et al. |
| 2011/0087672 A1 | 4/2011 | Hui |
| 2011/0113224 A1 | 5/2011 | Isshiki et al. |
| 2011/0151023 A1 | 6/2011 | Wernet |
| 2011/0251998 A1 | 10/2011 | Moore |
| 2011/0307903 A1 | 12/2011 | Vaddagiri |
| 2012/0072571 A1 | 3/2012 | Orzell et al. |
| 2012/0089711 A1 | 4/2012 | Zager |
| 2012/0151061 A1 | 6/2012 | Bartfai-walcott |
| 2012/0254849 A1 | 10/2012 | Wang |
| 2013/0103977 A1 | 4/2013 | Zimmermann |
| 2013/0346714 A1 | 12/2013 | Solihin |
| 2014/0172782 A1 | 6/2014 | Schuenzel |
| 2014/0376385 A1 | 12/2014 | Boss et al. |
| 2015/0169329 A1 | 6/2015 | Barrat |
| 2015/0222702 A1 | 8/2015 | Salle |
| 2015/0261518 A1 | 9/2015 | Viswanathan |
| 2015/0278219 A1 | 10/2015 | Phipps |
| 2015/0326542 A1 | 11/2015 | Serebrin |
| 2015/0347573 A1 | 12/2015 | Hosokawa |
| 2016/0162280 A1 | 6/2016 | Murayama et al. |
| 2016/0239395 A1 | 8/2016 | Madsen et al. |
| 2016/0266875 A1 | 9/2016 | Takahashi |
| 2016/0378168 A1* | 12/2016 | Branover .............. G06F 1/3203 713/323 |
| 2017/0272419 A1 | 9/2017 | Kumar |
| 2017/0337088 A1 | 11/2017 | Wang |
| 2018/0113728 A1 | 4/2018 | Musani et al. |
| 2018/0157723 A1 | 6/2018 | Chougule |
| 2018/0262979 A1 | 9/2018 | Wang et al. |
| 2018/0322276 A1 | 11/2018 | Brown |
| 2019/0104019 A1 | 4/2019 | Makovsky |
| 2019/0171472 A1* | 6/2019 | Wyble .................... H04L 67/56 |
| 2019/0199687 A1 | 6/2019 | Lan |
| 2019/0310872 A1 | 10/2019 | Griffin |
| 2019/0311041 A1 | 10/2019 | Shah |
| 2020/0110655 A1 | 4/2020 | Harwood et al. |
| 2020/0133772 A1 | 4/2020 | Dalmatov et al. |
| 2020/0156243 A1 | 5/2020 | Ghare et al. |
| 2020/0264930 A1 | 8/2020 | Mandagere et al. |
| 2020/0349238 A1 | 11/2020 | Tyagi |
| 2021/0165768 A1 | 6/2021 | D'halluin et al. |
| 2021/0200814 A1 | 7/2021 | Tal |
| 2021/0373947 A1 | 12/2021 | Kweon |
| 2022/0075613 A1 | 3/2022 | Ramachandran |
| 2022/0164186 A1 | 5/2022 | Pamidala |
| 2022/0171856 A1 | 6/2022 | Bhatt |
| 2022/0179683 A1 | 6/2022 | Verma et al. |
| 2023/0037124 A1 | 2/2023 | Mengwasser et al. |
| 2023/0080047 A1 | 3/2023 | Bashir |
| 2024/0248768 A1* | 7/2024 | Sethi ..................... G06F 9/5072 |
| 2024/0251021 A1* | 7/2024 | Sethi ..................... H04L 67/34 |

* cited by examiner

METHOD AND SYSTEM FOR MANAGING POWER CONSUMPTION FOR DEVICES

BACKGROUND

Computing devices often exist in environments that include many such devices (e.g., servers, containerized environments, virtualization environments, storage devices, network devices, etc.). Such environments may, from time to time, in whole or in part, require being twinned and/or migrated (e.g., moved from one set of devices to another). Such twinning and/or migrations often require large amounts of investigation, coordination, time, and manual steps to be performed by any number of system administrators. The devices may consume power. To reduce power consumption, devices may be turned off while not being used.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
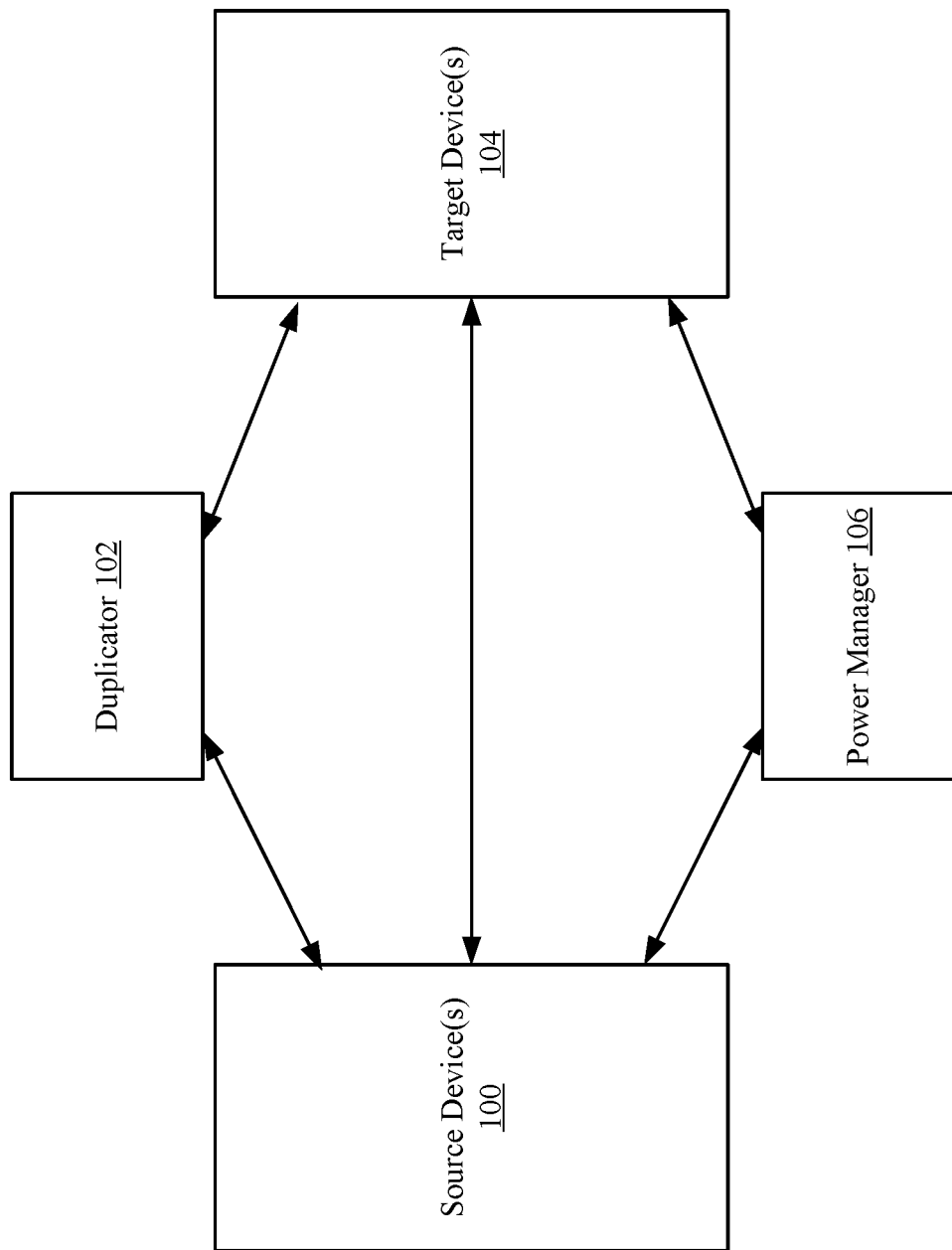
FIG. 1A shows a diagram of a system in accordance with one or more embodiments of the invention.

In the below description, numerous details are set forth as examples of embodiments described herein. It will be understood by those skilled in the art, and having the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regards to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for performing power management services. Servers executing applications may be unused and running in a data center for a portion of its life. Accordingly, remaining on and executing while the server and applications executing on the server are unused may result in tremendous waste of power, and as a result, environmental pollution. Currently, there is no intelligent method available to bring up the needed environment (e.g., an integration, staging, and/or production environment) upon a trigger. Furthermore, there is no auto-sleep method after the environment served its purpose.

To address, at least in part, the aforementioned issues, embodiments disclosed herein relate to generating a power schedule specifying power-on timeframes and sleep mode timeframes associated with devices and applications (i.e., infrastructure components) in an environment based on dependencies and network information and automatically powering on and sleeping the devices and application based on the power schedule.

FIG. 1A shows a diagram of a system in accordance with one or more embodiments described herein. The system may include any number of source devices (100), and any number of target devices (104). The system may also include a duplicator (102) and a power manager (106) each operatively connected to the source devices (100) and to the target devices (104). Each of these components is described below.

In one or more embodiments, the source devices (100) and the target devices (104) may be computing devices. Such computing devices may be referred to as endpoints. In one or more embodiments, an endpoint is any computing device, collection of computing devices, portion of one or more computing devices, or any other logical grouping of computing resources. In one or more embodiments, the source devices (100) may collectively be referred to as a source environment. Similarly, in one or more embodiments, target devices (104) may collectively be referred to as a target environment. In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fiber channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device. Other types of computing devices may be used without departing from the scope of the invention. In one or more embodiments, a set of computing devices (e.g., 100, 102, 104) may form all or a portion of a data domain, all, or part of which may require being duplicated (e.g., twinned or duplicated) from time to time (e.g., upon request and/or pursuant to a defined schedule). In one or more embodiments, a data domain is any set of computing devices (100) for which duplication services are performed.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the system also includes the duplicator (102). In one or more embodiments, the duplicator (102) is operatively connected to both the source devices (100) and the target devices (104). The duplicator (102) may be located within a source environment, within a target environment, or separate from and connected to both environments. In one or more embodiments, the duplicator (102) is a computing device. In one or more embodiments, duplicator (102) is any device, portion of a computing device (as described above), or any set of computing devices (as described above) capable of electronically processing instructions. The duplicator (102) may include the functionality to perform all, or a portion, of the methods of FIGS. 3-4 and FIGS. 6A-6B. For additional information regarding the functionality of the duplicator (102), refer to FIGS. FIGS. 3-4 and FIGS. 6A-6B.

In one or more embodiments, the system also includes the power manager (106). In one or more embodiments, the power manager (106) is operatively connected to both the source devices (100) and the target devices (104). The power manager (106) may be located within a source environment, within a target environment, or separate from and connected to both environments. In one or more embodiments, the power manager (106) is a computing device. In one or more embodiments, power manager (106) is any device, portion of a computing device (as described above), or any set of computing devices (as described above) capable of electronically processing instructions. The power manager (106) may include the functionality to perform all, or a portion, of the methods of FIGS. 5A-5B. For additional information regarding the functionality of the power manager (106), refer to FIGS. 5A-5B.

In one or more embodiments, the source devices (100), the duplicator (102), the power manager (106), and/or the target devices (104) are operatively connected via a network (not shown). A network may refer to an entire network or any portion thereof (e.g., a logical portion of the devices within a topology of devices). A network may include a datacenter network, a wide area network, a local area network, a wireless network, a cellular network, or any other suitable network that facilitates the exchange of information from one part of the network to another. A network may be located at a single physical location or be distributed at any number of physical sites. In one or more embodiments, a network may be coupled with or overlap, at least in part, with the Internet.

While FIG. 1A shows a configuration of components, other configurations may be used without departing from the scope of embodiments described herein. Accordingly, embodiments disclosed herein should not be limited to the configuration of components shown in FIG. 1A.

Figure 1B:
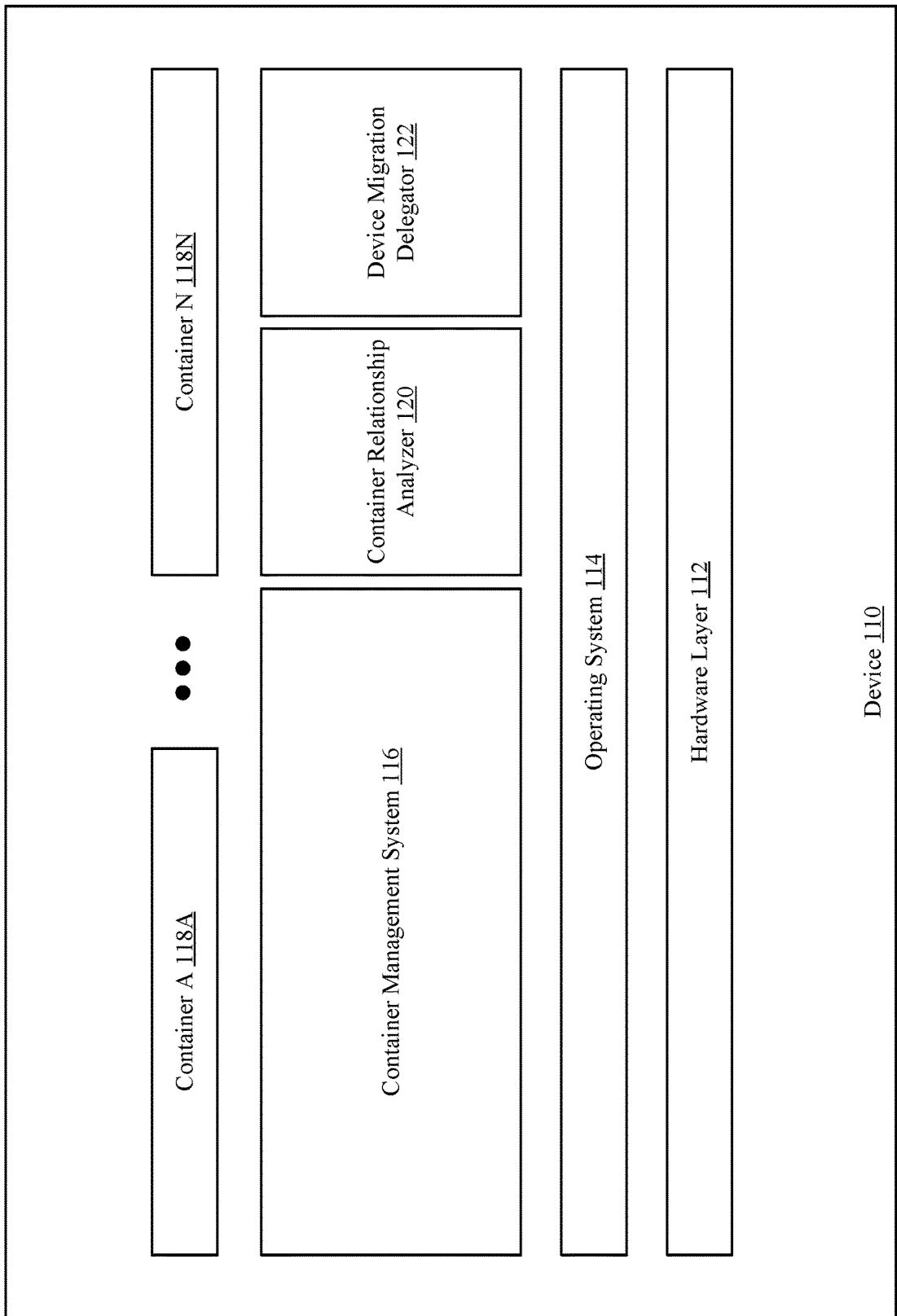
FIG. 1B shows a diagram of a device in accordance with one or more embodiments of the invention.

FIG. 1B shows a diagram of a device (110) in accordance with one or more embodiments described herein. The device (110) may correspond to a source device (100) and/or target device (104) and includes a hardware layer (112), an operating system (OS) (114), a container management system (CMS) (116), a number of containers (118A-118N), a container relationship analyzer (120), and a device migration delegator (122). Each of these components is described below.

In one or more embodiments of the invention, the hardware layer (112) is a collection of physical components configured to perform the operations of the device (110) and/or otherwise execute the software of the device (110) (e.g., those of the containers (118A-118N).

In one embodiment of the invention, the hardware layer (112) includes one or more communication interface(s). In one embodiment of the invention, a communication interface is a hardware component that provides capabilities to interface the device (110) with one or more other devices and allow for the transmission and receipt of data (including metadata) with those device(s). A communication interface may communicate via any suitable form of wired interface (e.g., Ethernet, fiber optic, serial communication etc.) and/or wireless interface and utilize one or more protocols for the transmission and receipt of data (e.g., Transmission Control Protocol (TCP)/Internet Protocol (IP), Remote Direct Memory Access, IEEE 801.11, etc.).

In one embodiment of the invention, the communication interface may implement and/or support one or more protocols to enable the communication between the device (110) with one or more other devices (e.g., other nodes in the computer and storage infrastructure (CSI), one or more clients, etc.). For example, the communication interface may enable the client application node to be operatively connected, via Ethernet, using a TCP/IP protocol to form a "network fabric" and enable the communication of data between the client application node and other external entities. In one or more embodiments of the invention, each node within the CSI may be given a unique identifier (e.g., an IP address) to be used when utilizing one or more protocols.

Further, in one embodiment of the invention, the communication interface, when using certain a protocol or variant thereof, supports streamlined access to storage media of other devices in the CSI. For example, when utilizing remote direct memory access (RDMA) to access data on another device in the CSI, it may not be necessary to interact with the software (or storage stack) of that other node in the CSI. Rather, when using RDMA, it may be possible for the client application node to interact only with the hardware elements of the other node to retrieve and/or transmit data, thereby avoiding any higher-level processing by the software executing on that other node. In other embodiments of the invention, the communicate interface enables direct communication with the storage media of other nodes using Non-Volatile Memory Express (NVMe) over Fabric (NVMe-oF) and/or persistent memory over Fabric (PMEMoF) (both of which may (or may not) utilize all or a portion of the functionality provided by RDMA).

In one embodiment of the invention, the hardware layer (112) includes one or more processor(s) (not shown). In one embodiment of the invention, a processor may be an integrated circuit(s) for processing instructions (e.g., those of the containers (118A-118N) and/or those received via a communication interface). In one embodiment of the invention, processor(s) may be one or more processor cores or processor micro-cores. Further, in one or more embodiments of the invention, one or more processor(s) may include a cache (not shown) (as described).

In one or more embodiments of the invention, the hardware layer (112) includes persistent storage. In one embodiment of the invention, persistent storage may be one or more hardware devices capable of storing digital information (e.g., data) in a non-transitory medium. Further, in one embodiment of the invention, when accessing persistent storage, other components of the device (110) are capable of only reading and writing data in fixed-length data segments (e.g., "blocks") that are larger than the smallest units of data normally accessible (e.g., "bytes").

Specifically, in one or more embodiments of the invention, when data is read from persistent storage, all blocks that include the requested bytes of data (some of which may include other, non-requested bytes of data) must be copied to other byte-accessible storage (e.g., memory). Then, only after the data is located in the other medium, may the requested data be manipulated at "byte-level" before being recompiled into blocks and copied back to the persistent storage.

Accordingly, as used herein, "persistent storage", "persistent storage device", "block storage", "block device", and "block storage device" refer to hardware storage devices that are capable of being accessed only at a "block-level" regardless of whether that device is volatile, non-volatile, persistent, non-persistent, sequential access, random access, solid-state, or disk based. Further, as used herein, the term "block semantics" refers to the methods and commands software employs to access persistent storage.

Examples of "persistent storage" include, but are not limited to, certain integrated circuit storage devices (e.g., solid-state drive (SSD), magnetic storage (e.g., hard disk drive (HDD), floppy disk, tape, diskette, etc.), or optical media (e.g., compact disc (CD), digital versatile disc (DVD), NVMe devices, computational storage, etc.). In one embodiment of the invention, NVMe device is a persistent storage that includes SSD that is accessed using the NVMe® specification (which defines how applications communicate with SSD via a peripheral component interconnect express) bus. In one embodiment of the invention, computational storage is persistent storage that includes persistent storage media and microprocessors with domain-specific functionality to efficiently perform specific tasks on the data being stored in the storage device such as encryption and compression.

In one or more embodiments of the invention, the hardware layer (112) includes memory. In one embodiment of the invention, memory, similar to persistent storage, may be one or more hardware devices capable of storing digital information (e.g., data) in a non-transitory medium. However, unlike persistent storage, in one or more embodiments of the invention, when accessing memory, other components of the device (110) are capable of reading and writing data at the smallest units of data normally accessible (e.g., "bytes").

Specifically, in one or more embodiments of the invention, memory may include a unique physical address for each byte stored thereon, thereby enabling software (e.g., containers (118A-118N)) to access and manipulate data stored in memory by directing commands to a physical address of memory that is associated with a byte of data (e.g., via a virtual-to-physical address mapping). Accordingly, in one or more embodiments of the invention, software is able to perform direct, "byte-level" manipulation of data stored in memory (unlike persistent storage data, which must first copy "blocks" of data to another, intermediary storage mediums prior to reading and/or manipulating data located thereon).

Accordingly, as used herein, "memory", "memory device", "memory storage", "memory storage device", and "byte storage device" refer to hardware storage devices that are capable of being accessed and/or manipulated at a "byte-level" regardless of whether that device is volatile, non-volatile, persistent, non-persistent, sequential access, random access, solid-state, or disk based. As used herein, the terms "byte semantics" and "memory semantics" refer to the methods and commands software employs to access memory.

Examples of memory include, but are not limited to, certain integrated circuit storage (e.g., flash memory, random access memory (RAM), dynamic RAM (DRAM), resistive RAM (ReRAM), etc.) and Persistent Memory (PMEM). PMEM is a solid-state high-performance byte-addressable memory device that resides on the memory bus, where the location of the PMEM on the memory bus allows PMEM to have DRAM-like access to data, which means that it has nearly the same speed and latency of DRAM and the non-volatility of NAND flash.

In one or more embodiments of the invention, the OS (114) is software executing on the device (110). In one embodiment of the invention, the OS (114) coordinates operations between software executing in "user space" (e.g., containers (118A-118N)) and one or more components of the hardware layer (112) to facilitate the proper use of those hardware layer (112) components.

In one embodiment of the invention, the CMS (116) is a platform for the centralized management and deployment of containers in a network or datacenter. In one embodiment, the CMS (116) may facilitate communication between containers (118A-118N) using, e.g., a bridge network. In one embodiment of the invention, the CMS (116) may include hardware, software, firmware, and any combination thereof. Further, the CMS (116) includes functionality to coordinate with the container relationship analyzer (120) (discussed below), start-up containers, duplicate containers, track the creation and deletion (and therefore manage the deployment) of containers in the device (110), generate, manage, update, and store a container-server table, and any other management activities related to the containers (118A-118N). Further, in one embodiment of the invention, the CMS (116) includes functionality to accept subscription requests from entities that want to receive publication (i.e., notification) of any changes to, updates of, or duplication of containers in a network or datacenter managed by the CMS.

In one embodiment of the invention, the CMS (116) may include a data repository (not shown). The data repository may be any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

In one or more embodiments, the CMS (116) may coordinate with the container relationship analyzer (120) to develop a duplication workflow (discussed below). Once a duplication workflow has been developed for a requested duplication, the entire duplication workflow may be presented to any number of entities that are responsible for the duplication. For example, stakeholders such as data center administrators, network administrators, system administrators, decision makers for an entity in control of a data center, etc. may each have to approve a duplication workflow before a duplication may take place.

In one embodiment of the invention, the container relationship analyzer (120) determines the relationships between the containers (118A-118N) and stores these relationships in a data store (not shown). The container relationship analyzer (120) may include hardware, software, firmware, and any combination thereof. In one embodiment, when two or more containers (118A-118N) are communicating over the bridge network, the container relationship analyzer (120) may analyze the communications between containers (118A-118N) to determine the relationships between the containers (118A-118N). For example, the container relationship analyzer (120) may determine the relationships by port mapping such as looking at port mapping metadata or the actual system internal traffic on various ports. By analyzing whether traffic on a specific port is outgoing or incoming, the container relationship analyzer (120) can determine when a container is the parent node, and when a container is the child node. For example, the container receiving traffic may be considered the parent node and the container sending traffic may be considered the child node. Further, a container that does not communicate with any other containers may be considered an independent container. The child or dependent container would be considered to have an IS-A relationship with the corresponding parent, and the parent or independent container would be considered to have a HAS-A relationship with the corresponding child or dependent container.

In one embodiment, the container relationship analyzer (120) may determine whether containers (118A-118N) have a correlated relationship, which would be considered a HAS-A relationship between the two correlated containers. In one embodiment, applications hosted on different containers may utilize the same registration ID. When one application on a first container uses a registration ID, it may make that registration ID available for other applications on other containers. Another application on a second container may then use the same registration ID, thereby establishing a connection between the first container and the second container. The container relationship analyzer (120) may determine the establishment of this connection and that the connection is based on using the same registration ID between applications in separate containers. Thus, the container relationship analyzer (120) determines that these two containers are correlated and assigns a HAS-A relationship to each container.

In one or more embodiments, the device migration delegator (122) may include the functionality to set up and perform paired migrations of data of the device (110). The device migration delegator (122) may include the functionality to perform all, or a portion of the methods of FIGS. 6A-6B. For additional information regarding the functionality of the device migration delegator (122), refer to FIGS. 6A-6B. The device migration delegator (122) may include hardware, software, firmware, and any combination thereof.

In one or more embodiments, the containers (118A-118N) are isolated, lightweight virtualization mechanisms (or software constructs) that allow for the running of application(s) or an operating system within the container without the overhead of executing a hypervisor. Minimal overhead is generated by containers because: (i) containers share the same operating system kernel with other containers and the underlying host (e.g., device (110)); and (ii) containers (unlike virtual machines) do not need to emulate physical hardware. In one embodiment of the invention, the containers (118A-118N) may be implemented virtually by the CMS (116). In one embodiment of the invention, the containers (118A-118N) may provide a more efficient, faster, and more portable mechanism for managing application development and deployment across a network or datacenter.

Figure 1C:
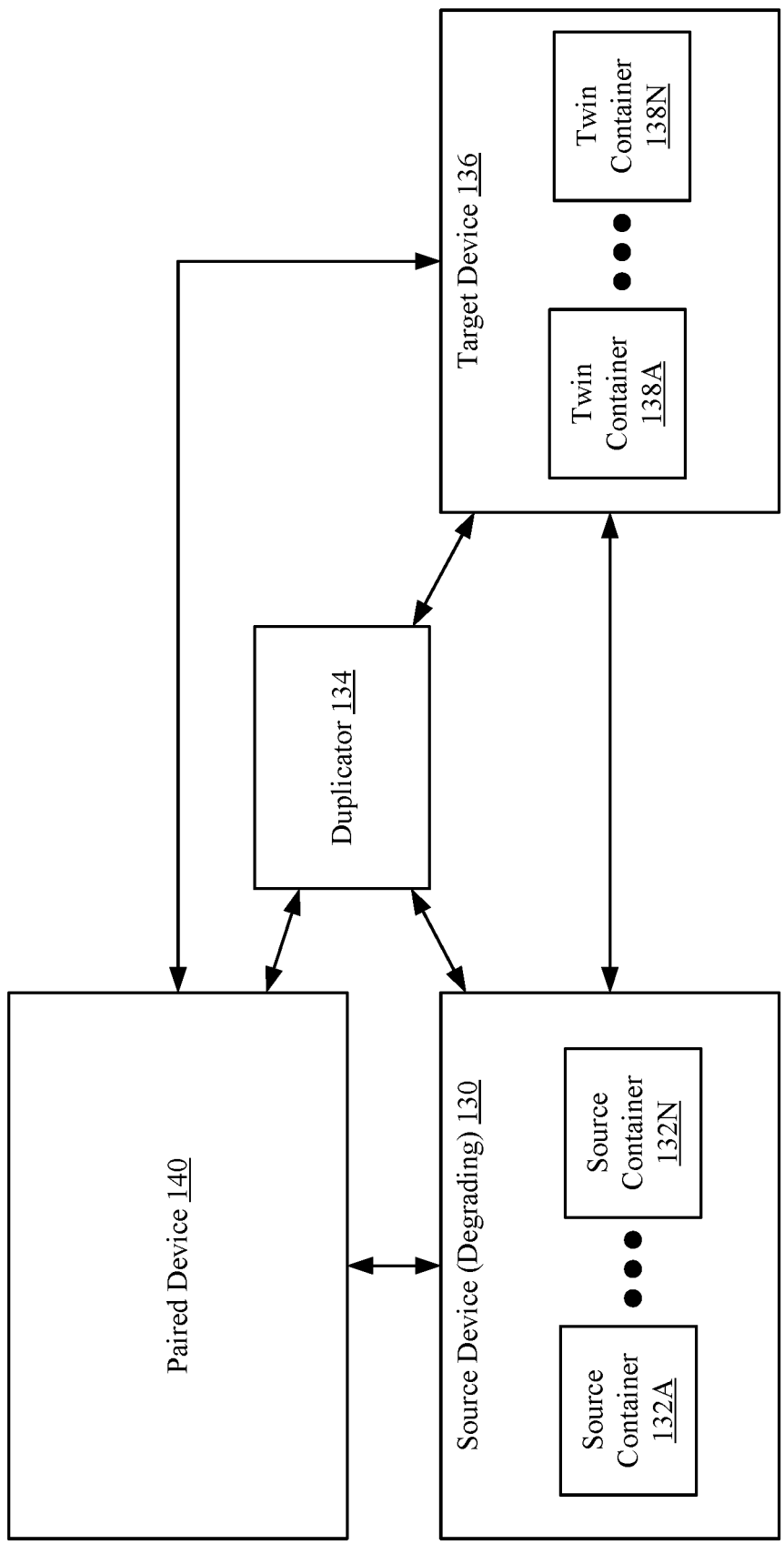
FIG. 1C shows a diagram of twinned containers in accordance with one or more embodiments of the invention.

FIG. 1C shows a diagram of a system of twinned containers during a paired migration in accordance with one or more embodiments described herein. The system may include a source device (130), a target device (136), a duplicator (134), and a paired device (140) all operatively connected to each other. Each of these components is described below.

The source device (130) may be one of the source device(s) (e.g., 100, FIG. 1A) described above. Likewise, the target device may be one of the target device(s) (e.g., 104, FIG. 1A) described above. In one or more embodiments, one or more of the source device (130), the target device (136), and the duplicator (134) may receive a request perform a paired migration. The paired migration may be performed because source device (130) is degrading. As a result, the paired device (140) may perform one or more paired migration actions delegated to it by the source device. The duplicator (134) may allocated paired device (140) to perform the paired migration of source device (130) to relieve the computational burden on the source device (130) and/or to maintain the availability of data stored on the source device (130) during migration. As a result, the source device may degrade slower, reducing the likelihood of data loss due to complete failure prior to the completion of the migration. As part of the migration, twins of the source containers (132A-132N) may be started on the target device (136) to produce twin containers (138A-138N), with each of the twin containers (138A-138N) being a twin to a corresponding one of the source containers (132A-132N). As used herein, a twinned container is one that is identical to its corresponding source container, but runs in a separate environment (e.g., device). Further, any changes made in a source container are also be made in its corresponding twin container. In one or more embodiments, the source containers (132A-132N) may be related to each other in various ways. As such, starting up the twin containers (138A-138N) should be in an order that prevents connection loss between the containers.

Figure 2A:
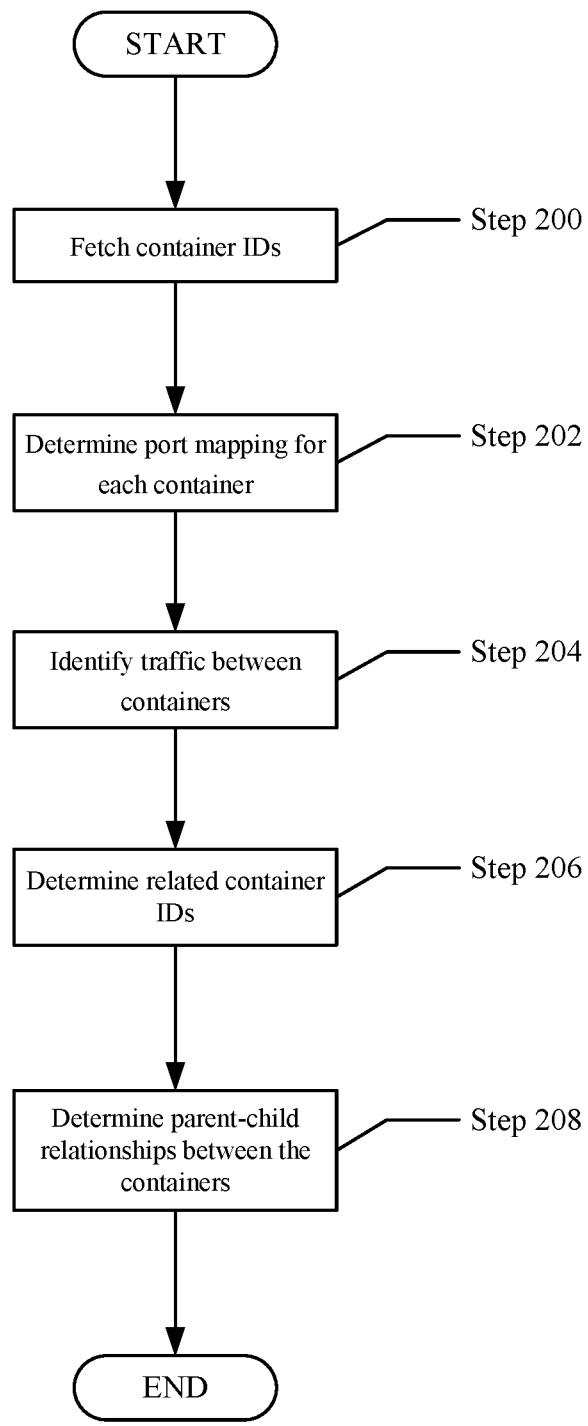
FIG. 2A shows a flowchart of a method to determine relationships between containers in accordance with one or more embodiments of the invention.

FIG. 2A shows a flowchart describing a method for determining a parent-child relationship between at least two containers in accordance with one or more embodiments disclosed herein.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 2A shows a flowchart of a method for determining a parent-child relationship between at least two containers, in accordance with one or more embodiments of the invention. This method may be performed on its own, as part of step 302 of the method of FIG. 3, or as part of step 402 of the method of FIG. 4. The method may be performed by, for example, the CMS (e.g., 116, FIG. 1B) in conjunction with the container relationship analyzer (e.g., 120, FIG. 1B) and/or any other part of either the source device (e.g., 100, FIG. 1A) OR target device (e.g., 104, FIG. 1A). Other components of the system illustrated in FIGS. 1A-1B may perform all, or a portion of, the method of FIG. 2A without departing from the invention.

In Step 200, for each container operating in a system, the method fetches the container identification (ID). This may be an ID given to a container by the CMS, the duplicator, a developer, or alternatively an ID that the system uses to identify the specific container.

In Step 202, the method determines the port mapping for each container. As discussed above, the containers may communicate over a network that may be facilitated by the CMS (e.g., 116, FIG. 1B). For example, applications running on the containers may communicate through ports on the network. Metadata corresponding to sending and receiving ports may provide a map of ports used for communicating between the containers, which may be used to determine relationships between containers.

In Step 204, the method identifies traffic between the containers. Data travelling from containers is identified by the CMS as incoming traffic. The direction of the traffic (i.e., sending or receiving) may be utilized to determine relationships between containers.

In Step 206, the method identifies all of the container IDs associated with the port mapping metadata and incoming traffic. At this point, the container relationship analyzer (e.g., 120, FIG. 1B) has information regarding the containers that are communicating and how they are communicating.

In Step 208, the method determines the parent-child relationships between the containers. As discussed above, when data travels between containers, one container is receiving traffic and another is sending traffic. Once the sending and receiving of traffic, along with the associated container IDs is determined, the method may determine that the container receiving traffic is a parent container and is assigned a HAS-A relationship. Further, the method may determine that the container sending traffic is a child container and is assigned an IS-A relationship.

Once Step 208 is complete, the method may end.

Figure 2B:
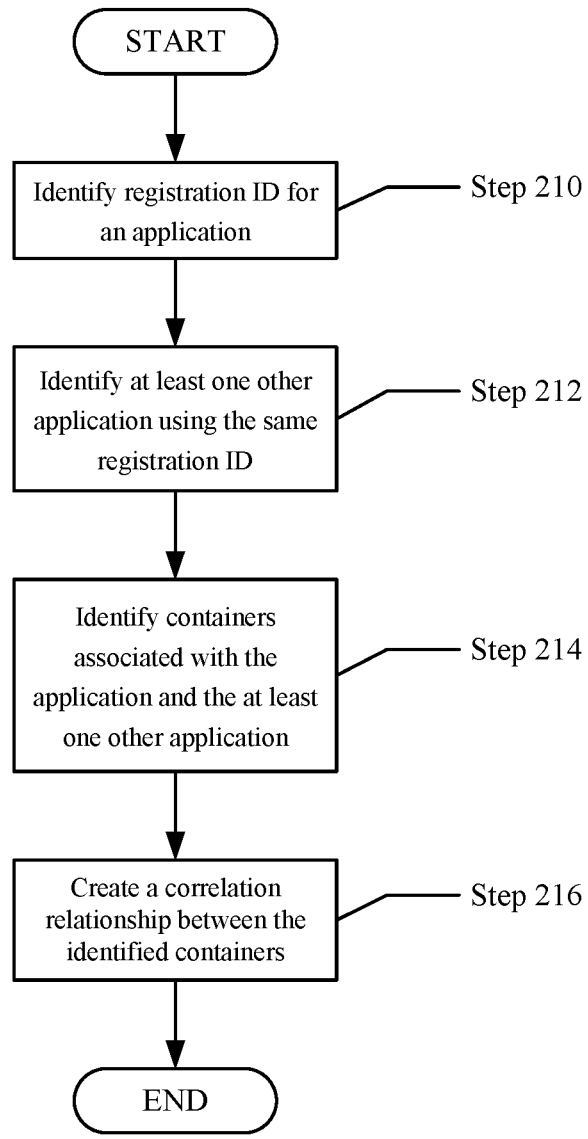
FIG. 2B shows a flowchart of a method to determine relationships between containers in accordance with one or more embodiments of the invention

FIG. 2B shows a flowchart describing a method for determining a correlated relationship between at least two containers in accordance with one or more embodiments disclosed herein.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 2B shows a flowchart of a method for determining a correlated relationship between at least two containers, in accordance with one or more embodiments of the invention. This method may be performed on its own, as part of step 302 of the method of FIG. 3, or as part of step 402 of the method of FIG. 4. The method may be performed by, for example, the CMS (e.g., 116, FIG. 1B) in conjunction with the container relationship analyzer (e.g., 120, FIG. 1B) and/or any other part of either the source device (e.g., 100, FIG. 1A) OR target device (e.g., 104, FIG. 1A). Other components of the system illustrated in FIGS. 1A-1B may perform all, or a portion of, the method of FIG. 2B without departing from the invention.

In Step 210, the method identifies a registration ID used for each application along with the container in which the application is running. This ID may be used to provide functionality for the associated application.

In Step 212, the method identifies at least one other application that is using the same registration ID. For example, after an application has registered and received a registration ID, the application may store the registration ID in a location that is available for other applications in separate containers to use the same registration ID. Thus, a second application may use a registration ID that is already in use by another application, which establishes a connection between the applications, and, thus, the containers on which the applications are running.

In Step 214, the method identifies the containers associated with the two applications that are using the same registration ID. Further, it should be appreciated that more than two applications may be using the same registration ID.

In Step 216, the method creates a correlation relationship between the identified containers. This relationship indicates that the two containers may work together in certain circumstances, but each container can function individually as well.

Once Step 216 is complete, the method may end.

Figure 3:
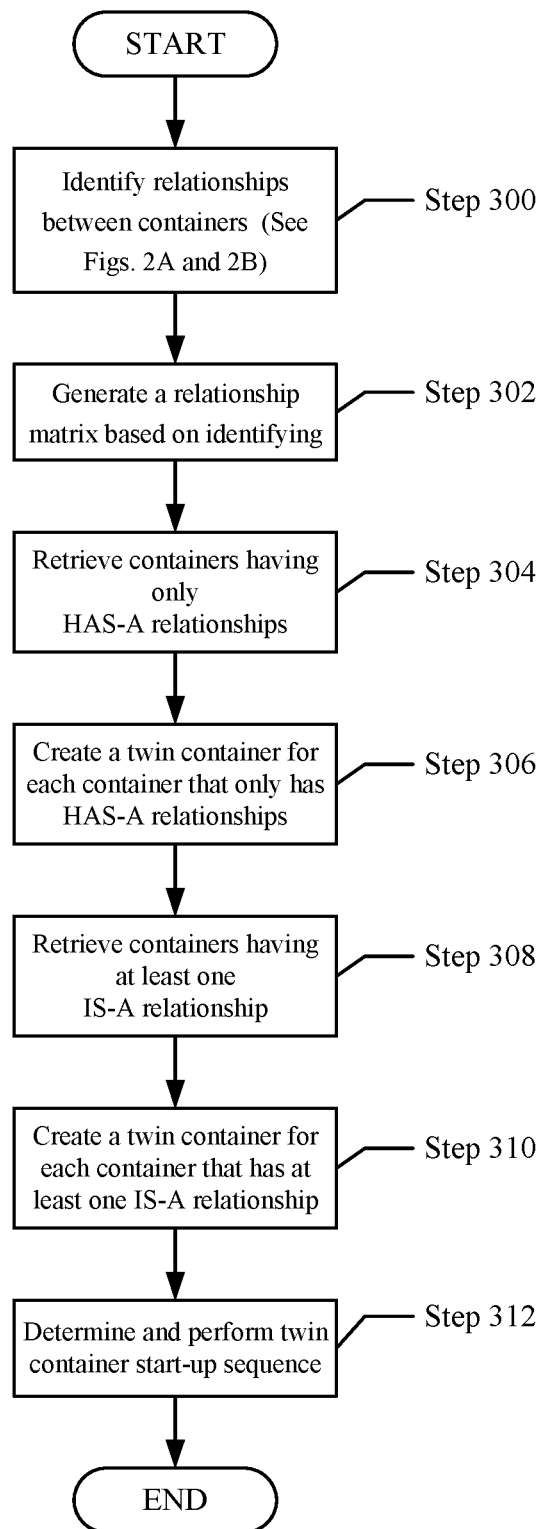
FIG. 3 shows a flowchart of a method to start-up twin containers in accordance with one or more embodiments of the invention.

FIG. 3 shows a flowchart describing a method for twinning one or more containers from a first device to a second device in accordance with one or more embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 3 shows a flowchart of a method for twinning one or more containers, in accordance with one or more embodiments of the invention. The method may be performed by, for example, the duplicator (102, FIG. 1B) and/or any other part of either the source device (100, FIG. 1A) or target device (104, FIG. 1A). Other components of the system illustrated in FIGS. 1A-1C may perform all, or a portion of the method of FIG. 3 without departing from the invention.

In step 300, the method identifies the relationships between the containers, as discussed in more detail in FIGS. 2A-2B. The methods above identify if at least two containers have a relationship and create the relationship types of HAS-A or IS-A relationships. The identifying the relationships may be in response to a request is received to twin any amount of a source device's containers to a target device.

In step 302, the container relationship analyzer uses this identification of the relationships between the at least two containers to produce a matrix for each container showing its relationship to other containers. The matrix can take the form of a table as shown in the exemplary table below:

TABLE 1

| Container | Relationship | Containers |
| --- | --- | --- |
| C1 | HAS-A | C2, C3, C4 |
| C2 | HAS-A | C1 |
| C3 | HAS-A | C1 |
| C4 | HAS-A; IS-A | C1, C5; C1 |
| C5 | HAS-A | C4 |
| C6 | Independent node | |
| C7 | HAS-A; IS-A | C8; C4 |
| C8 | HAS-A; IS-A | C7; C4 |
| C9 | IS-A | C5 |
| C10 | IS-A | C5 |
| C11 | IS-A | C9 |
| C12 | IS-A | C7, C4 |

TABLE 1-continued

| Container | Relationship | Containers |
| --- | --- | --- |
| C13 | IS-A | C6 |
| C14 | HAS-A; IS-A | C15; C13 |
| C15 | HAS-A | C14 |

In Table 1, the relationships between fifteen different containers (C1-C15) are shown. The target container is listed in the first column. The type of relationship the target container has with other containers is listed in the second column (HAS-A: where two containers are working together, IS-A: where the child container is dependent on the parent container, and Independent: the container is independent of the other containers). The containers that the target container has relationships with are listed in the third column. More than one container can have the same type of relationship with another container. The matrix produced in Step 302 can take other forms such as a database and in one or more embodiments of the invention, it can also be represented in the form of a relationship tree, which is discussed below with regards to the example in FIG. 5.

In Step 304, the method retrieves all of the containers having only HAS-A relationships and containers that are independent. For example, with reference to Table 1, this would include containers C1-C3, C5, C6, and C15.

In Step 306, the method creates a twin container on a target device for each of the containers retrieved in Step 304.

In Step 308, the method retrieves all of the containers having at least one IS-A relationship. For example, with reference to Table 1, this would include containers C4 and C7-C14.

In Step 310, the method creates a twin container for each of the containers retrieved in Step 308.

In Step 312, the method determines and performs the twin container start-up sequence. For example, the twin container start-up sequence may proceed as follows: the twin containers created in Step 306 are started first (but in any order because none of the containers created in Step 306 are dependent on any other container) and then, after all of the twin containers created in Step 306 are started, the the twin containers created in Step 310 may be started in an ordered manner.

For example, a check may be performed on the containers retrieved in Step 308 to determine which of those containers include at least one HAS-A relationship. Then, when starting the twin containers in Step 312, the method may start the twin containers corresponding to containers that include HAS-A and IS-A relationships before starting the twin containers corresponding to containers that include only IS-A relationships. Further, before starting a twin container corresponding to a container that includes an IS-A relationship, the method may check that the twin container of the corresponding parent container has already been successfully started.

Further, the twin container start-up sequence may result in the creation of the twin containers one-at-a-time. When creating the twin containers one-at-a-time, the twin container start-up sequence may include waiting a predefined amount of time (e.g., 30 seconds) between creating each twin container. The predefined amount of time may be utilized to check if each twin container was created successfully before creating the next one.

Once Step 312 is complete, the method may end.

Figure 4:
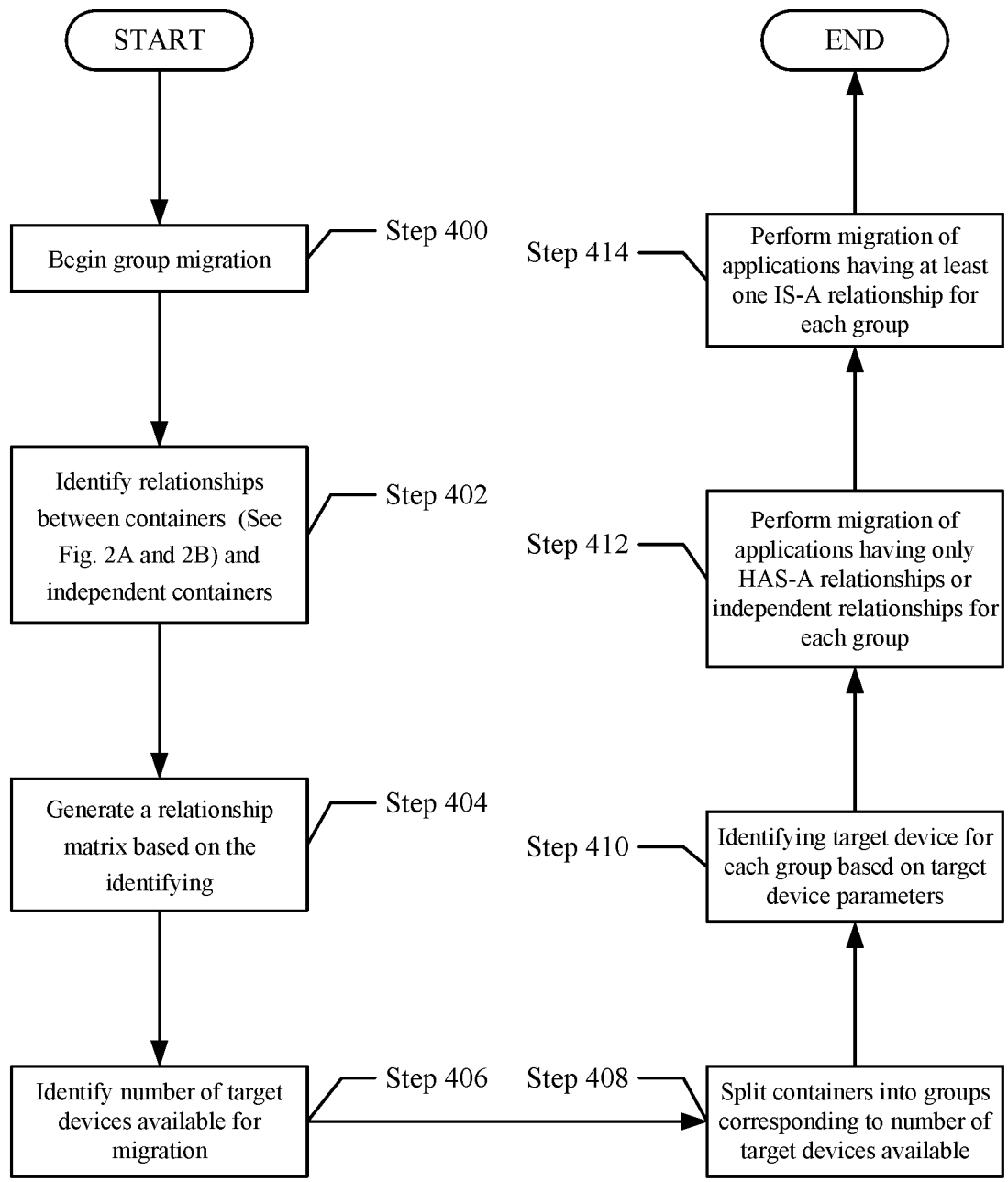
FIG. 4 shows a flowchart of a method to migrate groups of containers in accordance with one or more embodiments of the invention.

FIG. 4 shows a flowchart describing a method for migrating a group of containers from a first device to a second device in accordance with one or more embodiments disclosed herein.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 4 shows a flowchart of a method for migrating a group of containers, in accordance with one or more embodiments of the invention. The method may be performed by, for example, the duplicator (102, FIG. 1B) and/or any other part of either the source device (100, FIG. 1A) or target device (104, FIG. 1A). Other components of the system illustrated in FIGS. 1A-1C may perform all, or a portion of the method of FIG. 4 without departing from the invention.

In Step 400, the method begins by initiating a migration of a group of containers. As discussed above, a device may include a number of containers. At some point, a request may be received to migrate a portion of the containers on the device to a second device(s).

In step 402, the method identifies the relationships between the containers, as discussed in more detail in FIGS. 2A-2B. The methods above identify if at least two containers have a relationship and create the relationship types of HAS-A or IS-A relationships.

In step 404, the container relationship analyzer uses this identification of the relationships between the at least two containers to produce a matrix for each container showing its relationship to other containers. Step 404 is substantially similar to step 302 described above.

In Step 406, the method identifies the number of target devices available for migration. Then, in Step 408, the method splits the containers into groups based on the number of target devices identified as available in Step 406. The containers may be formed into any number of groups, but there needs to be a target device to which each group is migrated. For example, if there are two target devices available, then the containers to be migrated may be split into two groups. However, there may be a limit on the number of groups into which the containers may be split.

In one embodiment, the grouping of the containers may be based on their dependencies. Containers that are dependent on another container (i.e., containers with an IS-A relationship) must be grouped with the containers on which they are dependent. As such, the number of groups that the containers may be split into is finite and based on the relationships between the containers. In one or more embodiments, the number of target devices available may exceed the number of possible groups. In this embodiment, the containers may be split into the maximum number of groups possible.

In one embodiment, the grouping of the containers may be based on parameters related to the containers. The parameters may include the number of open ports, the connection reliability, network version (i.e., IPV4 or IPV6), network traffic, workload required by each container, workload available on each target device, priority of applications running on the containers, or any other parameter that may be affected by the use of containers on a device. For example, a first group of containers may need the IPV4 network version while another group may need the IPV6 network version.

In Step 410, the method identifies a target device for each group based on one or more parameters of the target device and the containers. In one or more embodiments, the parameters may include the number of open ports, the connection reliability, network version (i.e., IPV4 or IPV6), network traffic, workload required by each container, workload available on each target device, priority of applications running on the containers, or any other parameter that may be affected by the use of containers on a device. For example, a first group of containers may need the IPV4 network version and would thus be mapped to a target device that also communicated via IPV4.

In Step 412, the method performs migration of containers having only HAS-A relationships or independent relationships for each group.

In Step 414, the method performs migration of containers having at least one IS-A relationship for each group. In one embodiment, Steps 412 and 414 may be performed group by group (i.e., perform Step 412 then 414 for a first group, and then repeat for each subsequent group). In one embodiment, Step 412 may be performed for all groups and then Step 414 may be performed after all containers having only HAS-A relationships or independent relationships have been migrated to their respective target devices.

Once Step 414 is complete, the method may end.

Figure 5A:
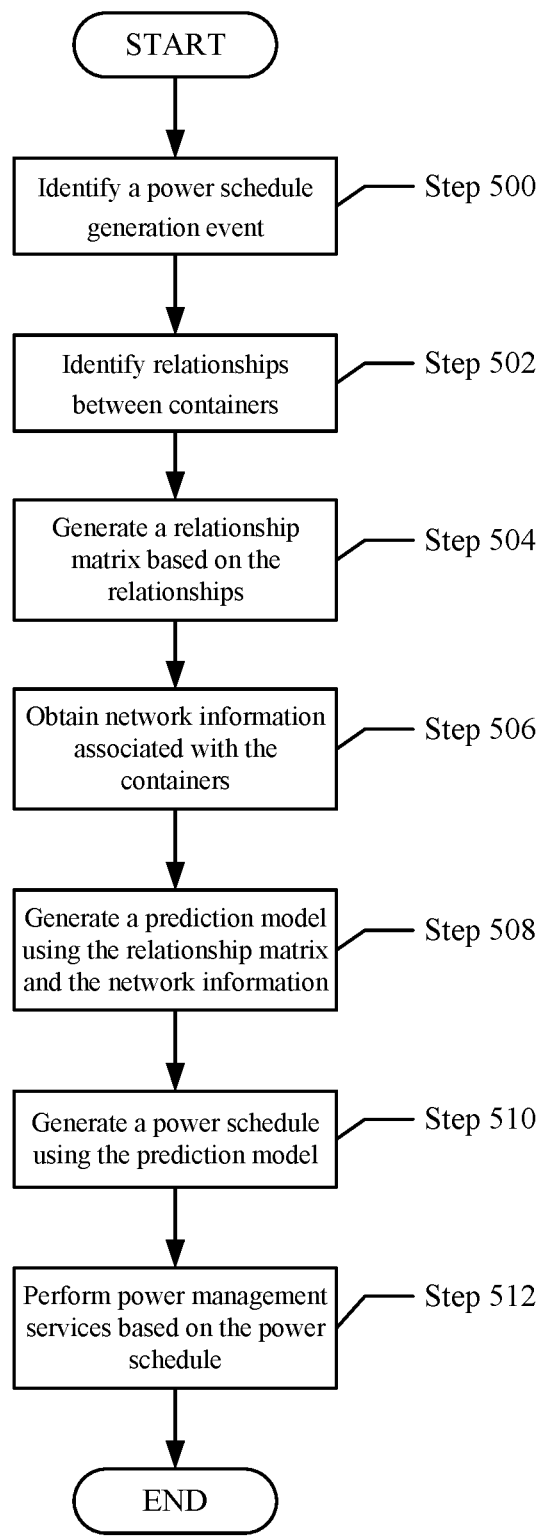
FIG. 5A shows a flowchart of a method to perform power management services in accordance with one or more embodiments of the invention.

FIG. 5A shows a flowchart of a method to generate power schedules and automatically sleep and start-up devices and/or components of the infrastructure based on the power schedules in accordance with one or more embodiments of the invention.

While the various steps in the flowchart shown in FIG. 5A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 5A shows a flowchart of a method perform power management services in accordance with one or more embodiments of the invention. The method may be performed by, for example, the power manager (106, FIG. 1A) and/or any other part of either the source device (100, FIG. 1A) or target device (104, FIG. 1A). Other components of the system illustrated in FIGS. 1A-1C may perform all, or a portion of the method of FIG. 5A without departing from the invention.

In Step 500, a power schedule generation event is identified. In one or more embodiments, the power manager may identify the power schedule generation event. In one embodiment, the power manager may identify the power schedule generate event based on a power schedule generation schedule. The power schedule generation schedule may specify points in time at which the power manager is to generate a power schedule. For example, the power schedule generation schedule may specify that a power schedule is to be generated every once Sunday at midnight, once a day at 9:00 PM, etc. The power schedule generation schedule may be associated with the system as a whole (e.g., all source devices and all target devices), or the power schedule generation schedule may be associated with a particular device (e.g., a particular source device) without departing from embodiments disclosed herein. The power manager may identify the occurrence of a point in time specified by a power schedule generation schedule as the power generation event.

In other embodiments, the power manager may obtain a power schedule generation request from a user of the system (e.g., a system administrator). The request may be obtained using any appropriate method of data transmission without departing from embodiments disclosed herein. For example, the user may submit the request through a user interface (e.g., a graphical user interface, a command-line interface, etc.). In yet another example, the power schedule generation request may be obtain from a client (not shown in FIG. 1A) used by the user as a message including one or more network packets through one or more network devices that operatively connect the client to the power manager. The power manager may identify the receipt of the power schedule generation request as the power schedule generation event. The power schedule generation request may be associated with the entire system (e.g., all source devices and all target devices), or the power schedule generation request may be associated with a particular device (e.g., a particular source device) without departing from embodiments disclosed herein.

The power schedule generation event may be identified via other and/or additional methods without departing from embodiments disclosed herein.

In Step 502, relationships between containers are identified. The power manager may initiate (e.g., by sending a request to the CMS and/or the container relationship analyzer) the performance of the methods discussed above in FIGS. 2A-2B for each device associated with the power schedule generation event. In response, the CMS and/or the container relationship analyzer of each device may perform the methods of FIGS. 2A-2B. The methods above identify if at least two containers have a relationship and create the relationship types of HAS-A or IS-A relationships. For additional information regarding the identifying of relationships between container, refer to FIGS. 2A-2B.

In Step 504, a relationship matrix is generated based on the relationships. In one or more embodiments, the power manager may initiate (e.g., by sending a request to the container relationship analyzer) the generation of the relationship matrix by the container relationship manager. Step 504 is substantially similar to Step 302 in FIG. 3 described above. For additional information regarding generating the relationship matrix, refer to FIG. 3. After generating the relationship matrix, the container relationship analyzer may send the relationship matrix to the power manager.

In Step 506, network information associated with the containers is obtained. In one or more embodiments, the power manager may request network information from all CMSs and/or container relationship analyzers of the one or more devices associated with the power schedule generation event. As discussed above, the network information may specify communications performed over the network between the containers and devices, the time in which the communications were performed, the originator and the receiver of the communication, whether communications were generated in response to previous communications, and/or whether communications caused future communications. The network information may include other and/or additional information regarding communications performed by the corresponding device and/or containers. The network information associated with the containers may be obtained via other and/or additional methods without departing from embodiments disclosed herein.

In Step 508, a prediction model is generated using the relationship matrix and the network information. In one or more embodiments, the power manager may generate or otherwise train a prediction model using the network information and the relationship matrix. The prediction model may include a light gradient-boosting machine (LightGBM) prediction model. The prediction model may include other and/or additional types of prediction models without departing from embodiments disclosed herein. The power manager may perform one hot encoding on the relationship matrix and/or the network information to generate training data. The training data may be applied to a LightGBM prediction algorithm to generate the prediction model. The prediction model may be generated using the relationship matrix and the network information via other and/or additional methods without departing from embodiments disclosed herein. The prediction model may be generated using the relationship matrix and the network information via other and/or additional methods without departing from embodiments disclosed herein.

In Step 510, a power schedule is generated using the prediction model. In one or more embodiments, the power schedule may be generated by applying the network information and the relationship matrix to the prediction model. The power schedule may specify a power-on timeframe and a sleep mode timeframe associated with one or more infrastructure components. The power schedule may include a list of one or more infrastructure component identifiers and the corresponding power-on timeframe and sleep mode timeframe associated with each of the infrastructure component identifiers. The infrastructure components may include devices and/or applications (i.e., one or more containers). In one or more embodiments, the power-on timeframe may refer to a period of time in which the corresponding infrastructure component should be powered-on, awake, and executing to service requests. In one or more embodiments, the sleep mode timeframe may refer to a period of time in which the corresponding infrastructure component state is held in memory (e.g., RAM), and power is cut to the infrastructure component and the memory is set to a minimum power state, just sufficient to retain data so a full reboot is not required. The power schedule may be generated using the prediction model via other and/or additional methods without departing.

In Step 512, power management services are performed based on the power schedule. In one or more embodiments, the power manager performs the power management services based on the power schedule. The power management services may include monitoring the current power schedule and automatically initiating power-on and sleep mode for infrastructure components based on the power-on timeframe and the sleep mode timeframe associated with the infrastructure component in the power schedule. In one or more embodiments, the power manager may also perform power management services for on-demand (i.e., unexpected or rare) requests or communications. For additional information regarding performing power management services for on-demand requests or communications, refer to FIG. 5.2. The power management services may be performed based on the power schedule via other and/or additional methods without departing from embodiments disclosed herein.

For example, a system may include three infrastructure components. The first infrastructure component may include a device, and the second and third infrastructure components are applications executing on the device. The power schedule may specify a power-on timeframe of Monday through Friday and a sleep mode timeframe of Saturday and Sunday every week for the device and the first application. The power schedule may further specify a power-on timeframe of Monday through Wednesday and a sleep mode timeframe of Thursday through Sunday for the second application. Accordingly, in such a scenario, the power manager may initiate the power-of all three infrastructure components on Monday (e.g., at midnight), while initiating the sleep mode of the second application on Thursday (e.g., at midnight) and initiating the sleep mode of the device and the first application on Saturday (e.g., at midnight). As a result, since the second application is not dependent on any other application on Thursday and Friday (e.g., does not obtain any requests/communications), the second app may be put into sleep mode before the device and the first application. Similarly, due to the first application experiencing network traffic on Thursday and Friday, the power-on timeframes of both the first application and the device, which executes the first application, are extended to Friday.

Once Step 512 is complete, the method may end.

Figure 5B:
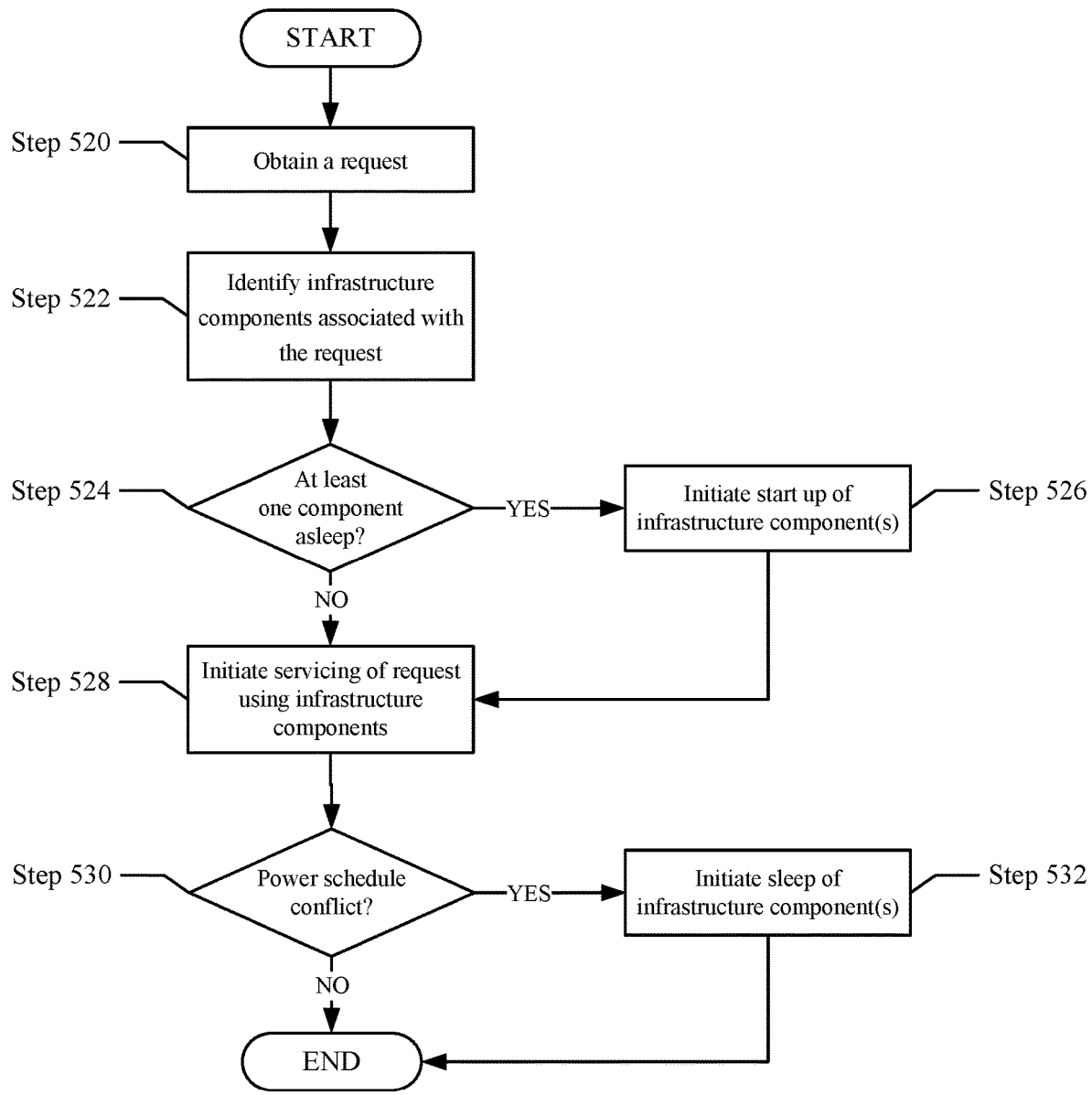
FIG. 5B shows a flowchart of a method to perform power management services based on on-demand requests in accordance with one or more embodiments of the invention.

FIG. 5B shows a flowchart of a method to handle on-demand requests in accordance with one or more embodiments of the invention.

While the various steps in the flowchart shown in FIG. 5B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 5B shows a flowchart of a method for determining a correlated relationship between at least two containers, in accordance with one or more embodiments of the invention. The method may be performed by, for example, the power manager (e.g., 106, FIG. 1A) and/or any other part of either the source device (100, FIG. 1A) or target device (104, FIG. 1A). Other components of the system illustrated in FIGS. 1A-1C may perform all, or a portion of, the method of FIG. 5B without departing from the invention.

In Step 520, a request is obtained. In one or more embodiments, the power manager may intercept, monitor, or otherwise obtain requests submitted to an infrastructure component of the system. The request may be obtained using any appropriate method of data transmission without departing from embodiments disclosed herein. For example, an entity (e.g., a container, a device, or a user) may send the request as a message including one or more network packets through one or more network devices that operatively connect the entity to the power manager and/or the infrastructure component. The request may be obtained via other and/or additional methods without departing from embodiments disclosed herein.

In Step 522, infrastructure components associated with the request are identified. In one or more embodiments, the power manager may identify the infrastructure components using the request. In one or more embodiments, the request may specify the destination of the request (e.g., the infrastructure component that will obtain the request) by including a container identifier, application identifier, and/or a device identifier in the header of the request. In other embodiments, the request may include a network address associated with the destination of the request. The power manager may parse the request to identify the infrastructure component that is the destination of the request. Additionally, the power manager may use the relationship matrix to identify any additional components upon which the destination infrastructure component may be dependent. For example, the application that is the destination of a request may be dependent upon the device on which it executes and one other application which also executes on the device. In such a scenario, the power manager may also identify the device and the other application as well as the destination application as infrastructure components associated with the request. The infrastructure components associated with the request may be identified via other and/or additional methods without departing from embodiments disclosed herein.

In Step 524, a determination is made as to whether at least one of the infrastructure components is asleep. As discussed above, the power schedule may include a list of infrastructure components (e.g., the infrastructure component identifiers) and the power-on timeframes and the sleep mode timeframes associated with each infrastructure component. For each of the infrastructure components identified in Step 522 above, the power manager may compare the current time with the corresponding sleep mode timeframe in the power schedule. In one or more embodiments disclosed herein, if the current time falls within the sleep mode timeframe associated with at least one of the identified infrastructure components, then the power manager determines that at least one of the infrastructure components is asleep. In one or more embodiments disclosed herein, if the current time does not fall within the sleep mode timeframe associated with any of the identified infrastructure components, then the power manager determines that at least one of the infrastructure components is not asleep. The determination as to whether at least one of the infrastructure components is asleep may be made via other and/or additional methods without departing from embodiments disclosed herein.

In one or more embodiments of the invention, if it is determined that at least one of the infrastructure components is asleep, then the method proceeds to Step 526. In one or more embodiments of the invention, if it is determined that at least one of the infrastructure components is not asleep, then the method proceeds to Step 528.

In Step 526, start up of the infrastructure component(s) is initiated. In one or more embodiments, the power manager may initiate the start up of the at least one infrastructure component. If the infrastructure component is an application, the power manager may send a request to the device that executes the application to start up or otherwise start execution of the application (and one or more containers associated with the application) by the device. The request may include the application identifier associated with the application. In response to obtaining the request, the device may start up or otherwise start execution of the application. If the infrastructure component is a device, the power manager may send a message to the device. The message may include, for example, a Wake-on-LAN (WoL) message, a Wake on Wireless LAN (WoWLAN), or a subnet directed broadcast. In response to obtaining the message by a network device of the device capable of listening for such messages while the device is in sleep mode, the device may wake up, start up, power on, or otherwise begin execution. The start up of the infrastructure component(s) may be initiated via other and/or additional methods without departing from embodiments disclosed herein.

In Step 528, servicing of the request using the infrastructures components is initiated. In one or more embodiments, the power manager may send, or otherwise initiate the sending, of the request to the destination infrastructure component. Upon receipt of the request, the destination infrastructure component, and if necessary, any other infrastructure components upon which the destination infrastructure may depend identified in Step 522, may perform one or more operations (e.g., read data, write data, process data, modify data, transmit data, etc.) to service the request. Servicing of the request using the infrastructure components may be initiated via other and/or additional methods without departing from embodiments disclosed herein.

In Step 530, a determination is made as to whether there is a power schedule conflict. As discussed above, the power schedule may include a list of infrastructure components (e.g., the infrastructure component identifiers) and the power-on timeframes and the sleep mode timeframes associated with each infrastructure component. After the request is serviced, for each of the infrastructure components identified in Step 522 above, the power manager may compare the current time with the corresponding sleep mode timeframe in the power schedule. In one or more embodiments disclosed herein, if the current time falls within the sleep mode timeframe associated with at least one of the identified infrastructure components, then the power manager determines that at least one of the infrastructure components is associated with a power schedule conflict. In one or more embodiments disclosed herein, if the current time does not fall within the sleep mode timeframe associated with any of the identified infrastructure components, then the power manager determines that there is no power schedule conflict. The determination as to whether there is a power schedule conflict may be made via other and/or additional methods without departing from embodiments disclosed herein.

In one or more embodiments of the invention, if it determined that there is a power schedule conflict, then the method proceeds to Step 532. In one or more embodiments of the invention, if it determined that there is not a power schedule conflict, then the method ends once Step 530 is completed.

In Step 532, sleep of the infrastructure component(s) is initiated. In one or more embodiments, the power manager may initiate the sleep mode of the at least one infrastructure component associated with a power schedule conflict. If the infrastructure component is an application, the power manager may send a request to the device that executes the application to sleep or otherwise stop execution of the application (and one or more containers associated with the application) by the device. The request may include the application identifier associated with the application. In response to obtaining the request, the device may sleep or otherwise stop execution of the application. If the infrastructure component is a device, the power manager may send a message to the device. The message may include, for example, a request to enter sleep mode. In response to obtaining the message, the device may enter sleep mode. Sleep of the infrastructure component(s) may be initiated via other and/or additional methods without departing from embodiments disclosed herein.

Once Step 532 is completed, the method may end.

Figure 6A:
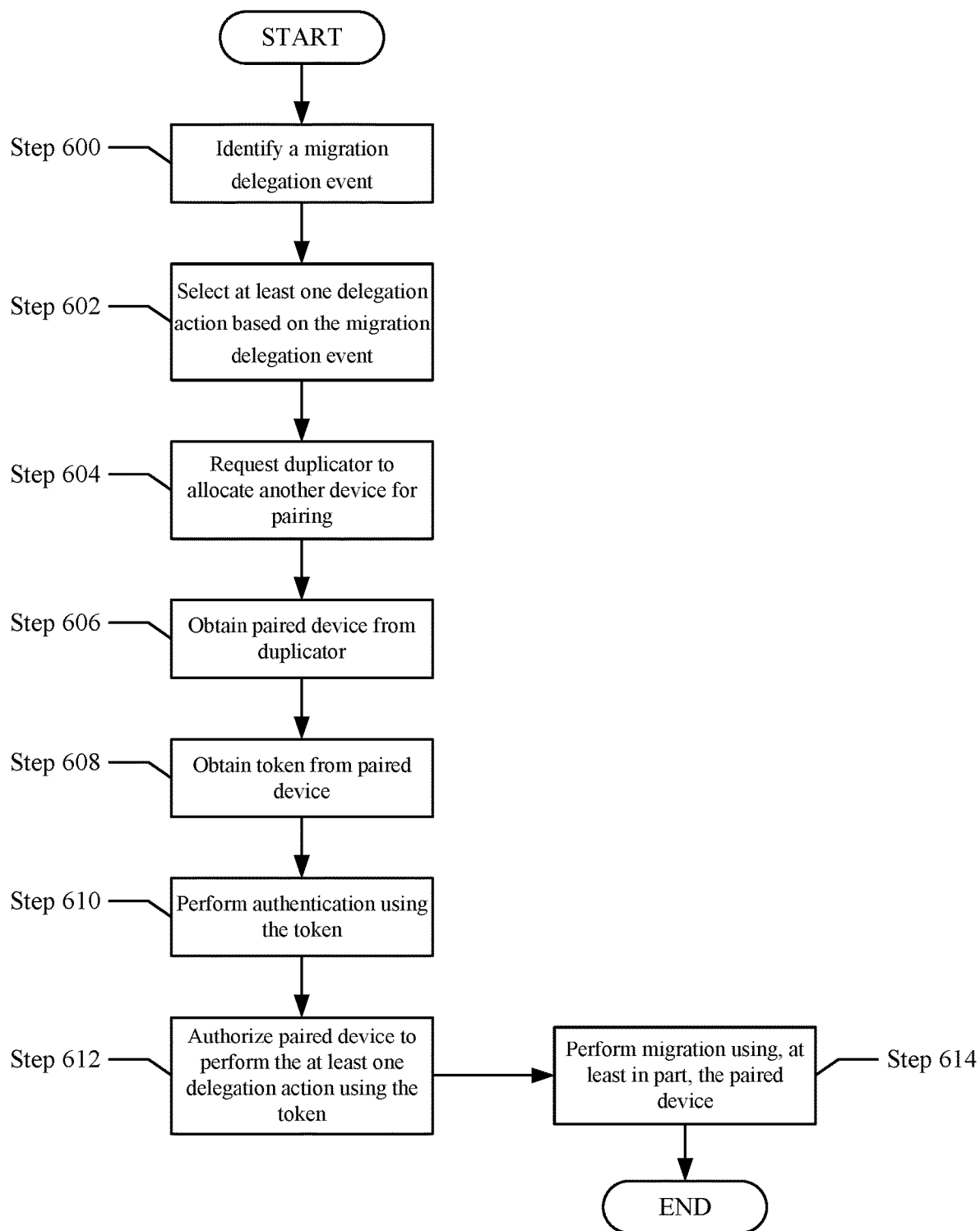
FIG. 6A shows a flowchart of a method for performing a paired migration in accordance with one or more embodiments of the invention.

FIG. 6A shows a flowchart of a method for performing a paired migration of a device using a paired device that performs one or more offloaded migration actions in accordance with one or more embodiments of the invention.

While the various steps in the flowchart shown in FIG. 6A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 6A shows a flowchart of a method for determining a parent-child relationship between at least two containers, in accordance with one or more embodiments of the invention. The method may be performed by, for example, the CMS (e.g., 116, FIG. 1B) in conjunction with the device migration delegator (e.g., 122, FIG. 1B) and/or any other part of either the source device (e.g., 100, FIG. 1A) or target device (e.g., 104, FIG. 1A). Other components (e.g., the duplicator (102), FIG. 1A) of the system illustrated in FIGS. 1A-1C may perform all, or a portion of, the method of FIG. 6A without departing from the invention.

In Step 600, a migration delegation event is identified. In one or more embodiments, the device migration delegator may identify the migration delegation event. In one embodiment, the device migration delegator may obtain a message from a user. The message may include a request to perform a paired migration of the device associated with the device migration delegator. The device migration delegator may identify the receipt of the message from the user as the migration delegation event.

In another embodiment, the device migration delegator may monitor the containers, the CMS, and/or the hardware layer of the device. The device migration delegator may generate performance metrics associated with the device based on the monitoring of the containers, CMS, and/or the hardware layer of the device. The device migration may also include or otherwise have knowledge of or access to a list of failure thresholds. The failure thresholds may include maximum or minimum performance metric values beyond or below which results in the determination of a failure or potential failure of a component. The failure thresholds may be set by a user or a third-party entity (e.g., a component vendor, manufacturer, etc.) and provided to the device migration delegator. In one or more embodiments, the device migration delegator may compare the performance metrics to the failure thresholds to identify any current failures or potential failures in the device. In one or more embodiments, the device migration delegator may also include a degradation policy. The degradation policy may refer to one or more data structures that specify requirements for identifying a degrading device. The requirements may include a quantity of identified failures and/or one or more types of identified failures on the device which, when identified, cause the device migration delegator to determine that the device is degrading. The degradation policy may be generated by a user or a third-party entity (e.g., a component vendor, manufacturer, etc.) and provided to the device migration delegator. The device migration delegator may identify the determination that the device is degrading as the migration delegation event.

A migration delegation event may be identified via other and/or additional methods without departing from embodiments disclosed herein.

In one or more embodiments, the performance metrics may include, for example, processor and/or processes performance metrics, memory performance metrics, storage performance metrics, network and input/output (IO) performance metrics. The performance metrics may be device level performance metrics (e.g., associated with a particular device and all of its components) and/or application level performance metrics (e.g., associated with a particular container). The performance metrics may also include storage solution metrics such as RAID or logical unit number (LUN) failures. The performance metrics may include other and/or additional types of performance metrics without departing from embodiments of the invention. Each of the aforementioned performance metrics are discussed below in more detail.

In one or more embodiments, the processor and processes metrics may include, for example, the processor latency, cycles per instruction, instruction throughput, instructions per second, processor temperature, number of processes executing and/or waiting to be executed by the processor, and/or processor load percentage. The processor and processes performance metrics may include other and/or additional metrics associated with processor performance without departing from the invention.

In one or more embodiments, the memory performance metrics may include, for example, memory utilization, access time, transfer rate, cycle time, faults per second, memory capacity, memory writes per second, and/or memory reads per second. The memory performance metrics may include other and/or additional metrics associated with memory without departing from the invention.

In one or more embodiments, the storage performance metrics may include, for example, storage capacity, storage utilization, storage throughput, storage input/output operations per second (IOPS), storage latency, mean time between failures, and total terabytes written over time. The storage performance metrics may include other and/or additional metrics associated with storage (physical or virtual) without departing from the invention.

In one or more embodiments, the network and IO performance metrics may include, for example, network bandwidth (e.g., bytes per second, kilobytes per second, megabytes per second, etc.), network throughput, network latency, network jitter, packet loss, bandwidth-delay product, and network load. The network and IO performance metrics may include other and/or additional metrics associated with network and IO performance without departing from the invention.

Continuing with the discussion of FIG. 6A, in Step 602, at least one delegation action is selected based on the migration delegation event. In one embodiment, when the migration delegation event includes obtaining a request for a user, the request may specify (e.g., through the inclusion of action identifiers, tags, set bits, set flags, etc. associated with one of the three migration actions discussed throughout) the at least one delegation actions the user desires the paired device to perform during the migration. As a result, the device migration delegator may parse the request to identify and select the one or more actions to be included in the at least one delegation action.

In another embodiment, when the migration delegation event includes determining that the device is degrading, the device migration delegator may use the degradation policy to select the at least one delegation action. In one or more embodiments, the degradation policy may specify the at least one delegation action based on the identified failures. The degradation policy may specify the at least one delegation action based on the number of failures identified in the device and/or the type of failures identified in the device. For example, the degradation policy may specify: (i) after a first quantity of failures are identified, select a first action as the at least one delegation action, (ii) after a second quantity of failures are identified, select a first and second action as the at least one delegation action, and (iii) after a third quantity of identified failures, select all three actions as the at least one delegation action. As another example, the degradation policy may specify that if one or more of a first portion of failures are identified, select a first action as the at least one delegation action. As discussed above, the user (e.g., a system administrator) may configure the degradation policy. The at least one delegation action may be selected based on the migration delegation event via other and/or additional methods without departing from embodiments disclosed herein.

In Step 604, a duplicator is requested to allocate another device for pairing. The device migration delegator may send a message to the duplicator. The message may include a request for pairing and the selected at last one delegation action. The message may further include device configuration information associated with the device. The message may include other and/or additional information without departing from embodiments disclosed herein. In one or more embodiments, the device configuration information may include one or more data structures that specify the type and/or quantities of resources (e.g., hardware layer resources and/or operating system as discussed above) associated with the device. The message may be sent using any appropriate method of data transmission without departing from embodiments disclosed herein. For example, the device migration delegator may send the message as one or more network packets through one or more network devices that operatively connect the device migration delegator to the duplicator. The duplicator may be requested to allocate another device for pairing via other and/or additional methods without departing from embodiments disclosed herein. For additional information regarding the allocation of another device for pairing, refer to FIG. 6B.

In Step 606, obtain a paired device from the duplicator. The device migration delegator may obtain a message from the duplicator. The message may include a device identifier associated with and specifying the device allocated by the duplicator to be paired with the device. The message may further include associated with the paired device (e.g., network address; security parameters associated with the paired device such a keys, passwords, etc.). The message may include other and/or additional information associated with the paired device without departing from embodiments disclosed herein. The message may be sent using any appropriate method of data transmission without departing from embodiments disclosed herein. For example, the duplicator may send the message as one or more network packets through one or more network devices that operatively connect the device migration delegator to the duplicator. The paired device may be obtained from the duplicator via other and/or additional methods without departing from embodiments disclosed herein.

In Step 608, a token is obtained from the paired device. In response to being allocated for pairing with the device by the duplicator, a device migration delegator paired device may generate a token. The token may be generated using any appropriate method of token generation without departing from embodiments disclosed herein. For example, the token may be generated using a random token generator, a cryptographic hash function, etc. The token may be generated using security parameters associated with the paired device such as the device identifier, an alphanumeric value associated with the device such as a password, etc. The token may be encrypted by the paired device using any appropriate method of encryption (e.g., 128-bit encryption) without departing from embodiments disclosed herein. The token may be sent by the device migration delegator of the paired device using any appropriate method of data transmission without departing from embodiments disclosed herein. For example, the paired device may send the token in a message as one or more network packets through one or more network devices that operatively connect the device migration delegator to the paired device. The token may be obtained from the paired device via other and/or additional methods without departing from embodiments disclosed herein.

In Step 610, authentication is performed using the token. In one or more embodiments, the device migration delegator may verify the token. The device migration delegator may, for example, decrypt the token and compare the security parameters derived from the token with the security parameters obtained from the duplicator to verify that the security parameters match and that the paired device may be trusted. Authentication may be performed using the token via other and/or additional methods without departing from embodiments disclosed herein.

In Step 612, the paired device is authorized to perform the at least one delegation action using the token. In one or more embodiments, the device migration delegator may authorize the paired device to perform the at least one delegation action using the token. The device migration action may send a request that includes the token to the paired device to perform the at least one delegation action. The request may include other and/or additional information without departing from embodiments disclosed herein. As a result, the paired device may then be authorized by the device migration delegator to perform the at least one delegation action of the migration. In response to obtaining the request, the paired device may authenticate the token and begin performing the at least one delegation action. The request may be sent by the device migration delegator to the paired device using any appropriate method of data transmission without departing from embodiments disclosed herein. For example, the device migration delegator may send the request in a message as one or more network packets through one or more network devices that operatively connect the device migration delegator to the paired device. The paired device may be authorized to perform the at least one delegation action using the token other and/or additional methods without departing from embodiments disclosed herein.

In Step 614, migration is performed using, at least in part, the paired device. In one or more embodiments, the paired device may perform the at least one delegation actions while the device may perform at least one non-delegation actions. As discussed above, migration may require the performance of three different actions: (i) encrypting the device data for migration, (ii) transferring the encrypted device data to a target device to complete migration, and (iii) serving device data to users and/or other devices or applications during migration. As discussed above, the at least one delegation action may include one or more of the three aforementioned actions performed by the paired device during migration. Non-delegation actions may include none, one, or more of the three aforementioned actions performed by the device during migration. The at least one delegation actions may not include the same action or actions included in the non-delegation actions. In other words, an action may not be performed by both the paired device and the device during migration.

As an example, consider a scenario in which the at least one delegation action includes both encryption and transferring the encrypted data during migration. Accordingly, the non-delegation actions only include serving device data to users and/or other devices during migration. As a result, during migration the paired device may encrypt the device data and transfer the encrypted device data to the target device, while the device may serve data to users and/or other devices.

As another example, consider a scenario in which the at least one delegation action includes only encryption. Accordingly, the non-delegation actions only include serving device data to users and/or other devices and transferring the encrypted data during migration. As a result, during migration the paired device may encrypt the device data, while the device may serve data to users and/or other devices and transfer the encrypted device data to the target device.

As yet another example, consider a scenario in which the at least one delegation action includes all of encryption, transferring the encrypted data, and serving data to users and/or other devices. Accordingly, the non-delegation actions include doing nothing because the paired device is performing all three actions. As a result, during migration the paired device may encrypt the device data, transfer the encrypted device data to the target device, and serve data to users and/or other devices while the device may do nothing.

In one or more embodiments, serving data may include obtaining requests for data and performing one or more operations to service the requests. The operations may include reading data and transferring data to the requesting entity (e.g., user or other device/application). In one or more embodiments, any appropriate method of encryption (e.g., elliptic-curve cryptography (ECC), Rivest-Shamir-Adleman (RSA) encryption, Advanced Encryption Standard (AES) encryption, etc.) may be used to encrypt the data without departing from embodiments disclosed herein. In one or more embodiments, the encrypted data may be transferred to target device via the methods discussed above in FIG. 4. Migration may be performed using, at least in part, the paired device via other and/or additional methods without departing from embodiments disclosed herein.

Once Step 614 is completed, the method may end.

Figure 6B:
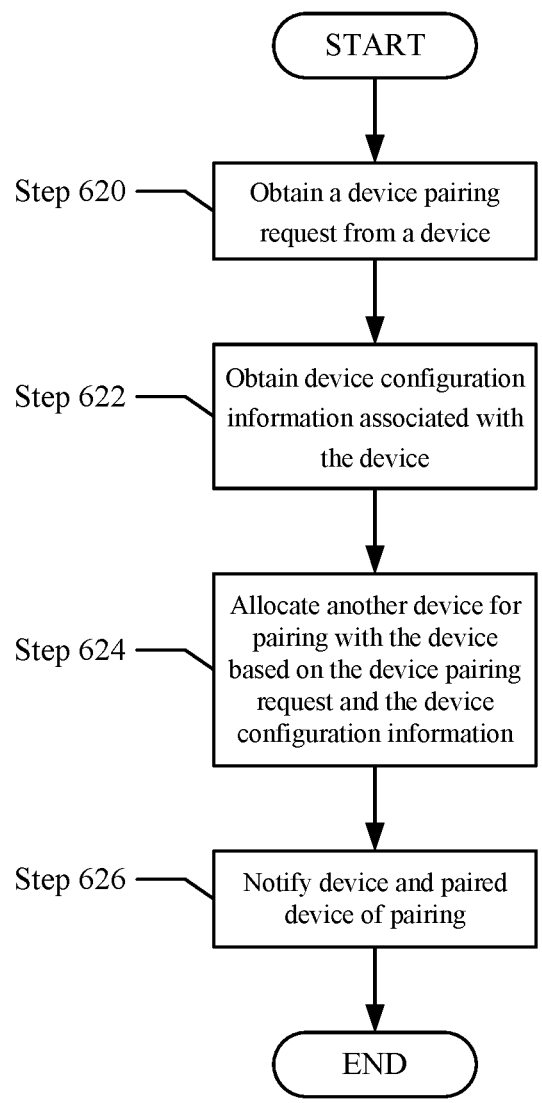
FIG. 6B shows a flowchart of a method for allocating a paired device for migration in accordance with one or more embodiments of the invention.

FIG. 6B shows a flowchart of a method for selecting and allocating a paired device for migration based on the selected delegation actions and the device configuration in accordance with one or more embodiments of the invention.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 6B shows a flowchart of a method for allocating a paired device for migration in accordance with one or more embodiments of the invention. This method may be performed on its own or as part of Steps 604-606 of the method of FIG. 6A. The method may be performed by, for example, the duplicator (e.g., 102, FIG. 1A) in conjunction with the device migration delegator (e.g., 122, FIG. 1B) and/or any other part of either the source device (e.g., 100, FIG. 1A) or target device (e.g., 104, FIG. 1A). Other components of the system illustrated in FIGS. 1A-1C may perform all, or a portion of, the method of FIG. 6B without departing from the invention.

In Step 620, a device pairing request is obtained from a device. The device migration delegator may send a message to the duplicator. The message may include a device pairing request for pairing another device to the device associated with the device migration delegator. The message may also include the selected at last one delegation action. The message may further include device configuration information associated with the device. The message may yet further include the quantity of data associated with the migration request. The message may include other and/or additional information without departing from embodiments disclosed herein. The message may be sent using any appropriate method of data transmission without departing from embodiments disclosed herein. For example, the device migration delegator may send the message as one or more network packets through one or more network devices that operatively connect the device migration delegator to the duplicator. The device paring request may be obtained from the device via other and/or additional methods without departing from embodiments disclosed herein.

In Step 622, device configuration information associated with the device is obtained. As discussed above, the message that includes the device pairing request may also include the device configuration information. Accordingly, the duplicator may parse the message to obtain the device configuration information.

In embodiments in which the message does not include the device configuration information, the duplicator may send a follow up request to the device migration delegator for the device configuration information. In response to obtaining the request, the device migration delegator may generate or obtain the device configuration information and send the device configuration information to the duplicator. The follow up request and the device configuration information may be sent using any appropriate method of data transmission without departing from embodiments disclosed herein. For example, the follow up request and the device configuration information may be sent as messages including one or more network packets through one or more network devices that operatively connect the device migration delegator to the duplicator. The device configuration information associated with the device may be obtained via other and/or additional methods without departing from embodiments disclosed herein.

In Step 624, another device is allocated for pairing with the device based on the device pairing request and the device configuration information. As discussed above, the device configuration information may include one or more data structures that specify the type and/or quantities of resources (e.g., hardware layer resources and/or operating system as discussed above) associated with the device to be paired with the allocated device. The duplicator may include, have knowledge of, or otherwise have access to a list of devices (e.g., device identifiers) in the system. The list may further include the device configuration information and the current utilization associated with each device. The duplicator may identify devices included in the list of devices that have matching or similar device configuration information compared to the device associated with the device pairing request. The duplicator may further identify, of the devices with matching or similar device configuration information, the devices with the capacity to perform the at least one selected delegation action on the amount of data associated with device pairing request based on current utilization of the devices. The duplicator may include historical data associated with the devices that indicates the required device resource capacity to perform the at least one delegation action on the quantity of data for each device. The duplicator may then allocate one of the identified devices to for pairing with the device. Another device may be allocated for pairing with the device based on the device paring request and the device configuration information via other and/or additional methods without departing from embodiments disclosed herein.

In Step 626, the device and the paired device are notified of the pairing. The duplicator may send a message to each of the device migration delegators of the device and the paired device. Each message may include a device identifier associated with and specifying the other device (e.g., the message to the device may include the device identifier associated with the paired device and the message to the paired device may include the device identifier associated with the device). The messages may further include information associated with the other device (e.g., network address; and/or security parameters associated with the paired device such a keys, passwords, etc.). The messages may include other and/or additional information associated with the paired device without departing from embodiments disclosed herein. The messages may be sent using any appropriate method of data transmission without departing from embodiments disclosed herein. For example, the duplicator may send the messages as one or more network packets through one or more network devices that operatively connect the device migration delegators of the device and the paired device to the duplicator. The device and the paired device may be notified of the pairing via other and/or additional methods without departing from embodiments disclosed herein.

Once Step 626 is complete, the method may end.

Example

Figure 7:
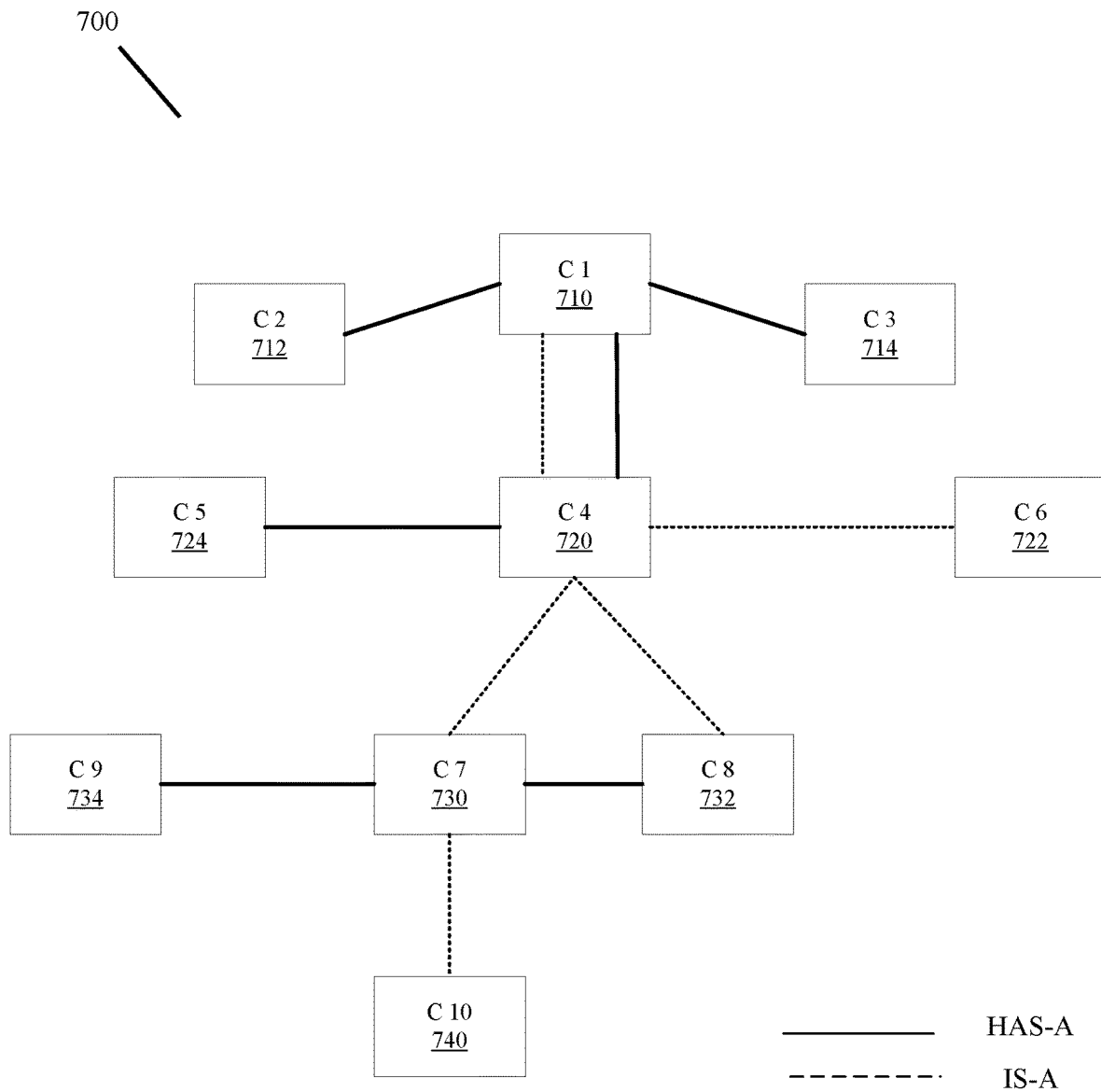
FIG. 7 shows an example of a relationship tree in accordance with one or more embodiments of the invention.

FIG. 7 shows an example of a relationship tree (700) in order to better describe the relationships between multiple containers and the order, according to the methods of FIGS. 2A-4, that containers in an exemplary source device (e.g., 100, FIG. 1A), in accordance with one or more embodiments of the invention, are duplicated. While the example is shown as a relationship tree for easier understanding, other methods of organizing the applications can be used such as a table, and/or relationship matrix. The tree includes ten containers (710-740) with either a HAS-A, IS-A, or both relationships with other containers. More or less containers can be mapped in this manner and the number of containers is only dependent on the number of containers that the duplication described in the method of FIGS. 3 and 4 is specified to be performed as specified by either a user, administrator, or other components of the duplicator (e.g., 102, FIG. 1A).

The first container (710) has three HAS-A relationships, one with the second container (712), one with the third container (714) and one with the fourth container (720). The first container (710) also has an IS-A relationship with the fourth container (720). Accordingly, the first container (710) and the fourth container (720) have a parent-child relationship. The fourth container (720) additionally has a HAS-A relationship with the fifth container (724) and IS-A relationships with the sixth (722), seventh (730), and eighth containers (732). The seventh (730) and eighth containers (732) have a HAS-A relationship with each other and the seventh container (730) also has a HAS-A relationship with the ninth container (734) and an IS-A relationship with the tenth container (740).

When performing the duplication (which may correspond to creating twin containers or migrating containers), as described in more detail with regards to FIGS. 2A-4, the container relationship analyzer (e.g., 120, FIG. 1B) determines the above relationships. The duplicator (e.g., 102, FIG. 1A) then duplicates the containers, in accordance with one or more embodiments of the invention. The second (712), third (714), fifth (724), and ninth (734) containers are duplicated first as they have only HAS-A relationships. Then the containers with at least one IS-A relationship are duplicated with the child container being duplicated after the parent container is duplicated and started successfully. Accordingly, the first container (710) is then duplicated and successfully started followed by the fourth container (720), which is followed by the sixth (722), seventh (730), and eighth (732) containers. Finally, once all other containers have successfully started, the tenth container (440) is duplicated.

Other orders of duplicating can be considered in accordance with one or more embodiments of the invention based on criteria specified by a user or administrator as well as other components of the duplicator (e.g., 102 of FIG. 1A) in addition to the order specified in the methods of FIGS. 2A-4. FIG. 7, is intended as an example only.

End Example

Figure 8:
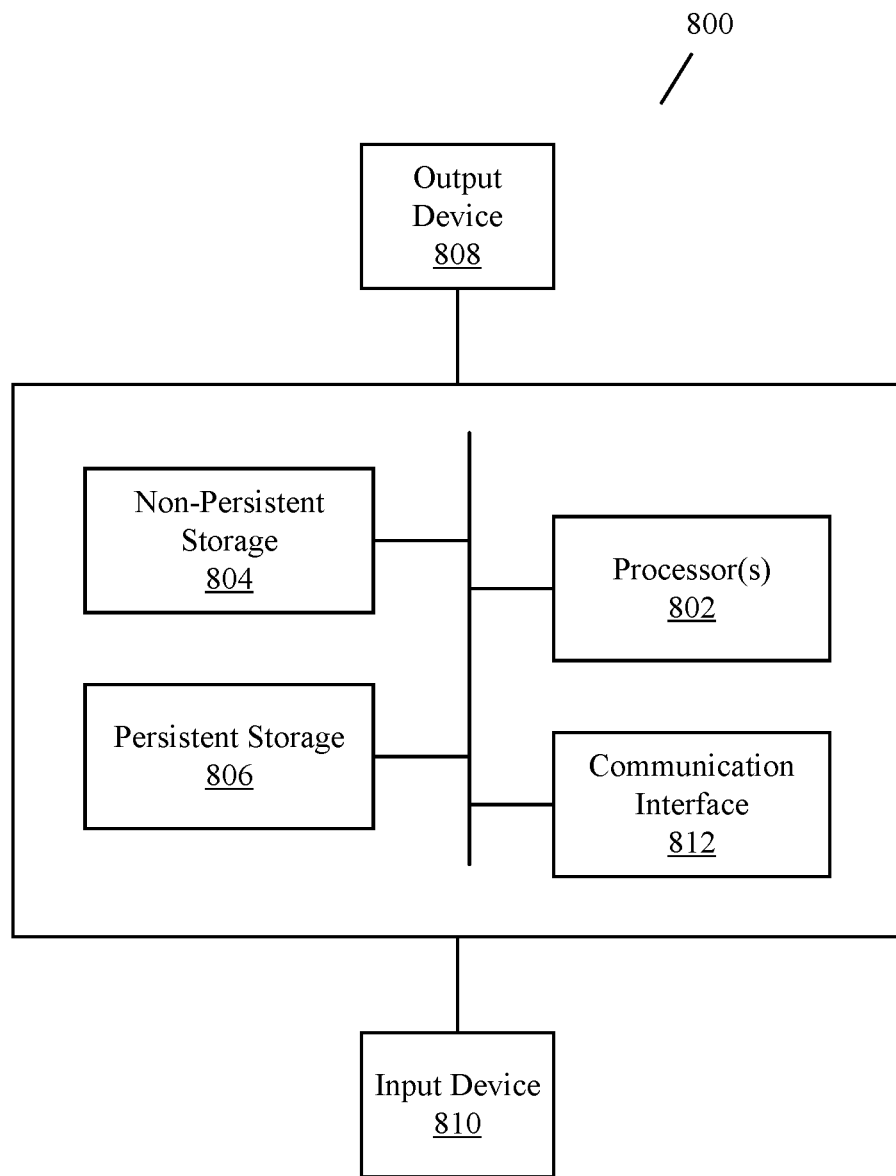
FIG. 8 shows a computing system in accordance with one or more embodiments of the invention.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many diverse types of computing devices exist, and the aforementioned input and output device(s) may take other forms.

The problems discussed above should be understood as being examples of problems solved by embodiments of the invention, and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing power management services for devices, comprising:
   identifying, by a processor, a power schedule generation event associated with devices;
   in response to identifying the power schedule generation event:
      identifying relationships between containers of the devices;
      generating a relationship matrix based on the identifying;
      obtaining network information associated with the containers;
      generating a prediction model using the relationship matrix and the network information;
      generating power schedules associated with the devices using the prediction model;
      making a first determination that a power schedule of the power schedules indicates a sleep event associated with an infrastructure component;
      in response to the first determination:
         initiating sleep mode for the infrastructure component;
         making a second determination that the power schedule indicates a wake event associated with the infrastructure component; and
         in response to the second determination:
            initiating start-up of the infrastructure component;
            obtaining a request;
            identifying a second infrastructure component associated with the request;
            making a third determination that the second infrastructure component is asleep based on a second power schedule associated with the second infrastructure component; and
            in response to the third determination;
            initiating start-up of the second infrastructure component, wherein the request is serviced by the second infrastructure component after the start-up of the second infrastructure component.

2. The method of claim 1, wherein the power schedule specifies a power-on timeframe and a sleep mode timeframe associated with the infrastructure component.

3. The method of claim 1, wherein the infrastructure component comprises a device of the devices.

4. The method of claim 1, wherein the infrastructure component comprises an application executing on a device of the devices, wherein the application comprises a portion of the containers.

5. A method for performing power management services for devices, comprising:
   identifying, by a processor, a power schedule generation event associated with devices;
   in response to identifying the power schedule generation event:
      identifying relationships between containers of the devices;
      generating a relationship matrix based on the identifying;
      obtaining network information associated with the containers;
      generating a prediction model using the relationship matrix and the network information;
      generating power schedules associated with the devices using the prediction model; and
      performing power management services for the devices based on the power schedule.

6. The method of claim 5, wherein performing the power management services for the devices based on the power schedules comprises:

making a determination that a power schedule of the power schedules indicates a sleep event associated with an infrastructure component; and
in response to the determination:
initiating sleep mode for the infrastructure component.

7. The method of claim 5, wherein performing the power management services for the devices based on the power schedules comprises:
making a determination that a power schedule of the power schedules indicates a wake event associated with an infrastructure component; and
in response to the determination:
initiating start-up of the infrastructure component.

8. The method of claim 5, wherein performing the power management services for the devices based on the power schedules comprises:
obtaining a request;
identifying an infrastructure component associated with the request;
making a determination that the infrastructure component is asleep based on a power schedule of the power schedules associated with the infrastructure component;
in response to the determination;
initiating start-up of the infrastructure component;
initiating servicing of the request using the infrastructure component;
after servicing the request:
making a second determination that the infrastructure component is associated with a power schedule conflict based on the power schedule; and
in response to the second determination:
initiating sleep mode for the infrastructure component.

9. The method of claim 5, wherein the power schedule specifies a power-on timeframe and a sleep mode timeframe associated with an infrastructure component.

10. The method of claim 9, wherein the infrastructure component comprises a device of the devices.

11. The method of claim 9, wherein the infrastructure component comprises an application executing on a device of the devices, wherein the application comprises a portion of the containers.

12. A non-transitory computer readable medium comprising computer readable program code, which when executed by a computer processor enables the computer processor to perform a method for performing power management services for devices, the method comprising:
identifying, by the processor, a power schedule generation event associated with devices;
in response to identifying the power schedule generation event:
identifying relationships between containers of the devices;
generating a relationship matrix based on the identifying;
obtaining network information associated with the containers;
generating a prediction model using the relationship matrix and the network information;
generating power schedules associated with the devices using the prediction model; and
performing power management services for the devices based on the power schedule.

13. The non-transitory computer readable medium of claim 12, wherein performing the power management services for the devices based on the power schedules comprises:
making a determination that a power schedule of the power schedules indicates a sleep event associated with an infrastructure component; and
in response to the determination:
initiating sleep mode for the infrastructure component.

14. The non-transitory computer readable medium of claim 12, wherein performing the power management services for the devices based on the power schedules comprises:
making a determination that a power schedule of the power schedules indicates a wake event associated with an infrastructure component; and
in response to the determination:
initiating start-up of the infrastructure component.

15. The non-transitory computer readable medium of claim 12, wherein performing the power management services for the devices based on the power schedules comprises:
obtaining a request;
identifying an infrastructure component associated with the request;
making a determination that the infrastructure component is asleep based on a power schedule of the power schedules associated with the infrastructure component;
in response to the determination;
initiating start-up of the infrastructure component;
initiating servicing of the request using the infrastructure component;
after servicing the request:
making a second determination that the infrastructure component is associated with a power schedule conflict based on the power schedule; and
in response to the second determination:
initiating sleep mode for the infrastructure component.

16. The non-transitory computer readable medium of claim 12, wherein the power schedule specifies a power-on timeframe and a sleep mode timeframe associated with an infrastructure component.

17. The non-transitory computer readable medium of claim 16, wherein the infrastructure component comprises a device of the devices.

18. The non-transitory computer readable medium of claim 16, wherein the infrastructure component comprises an application executing on a device of the devices, wherein the application comprises a portion of the containers.

* * * * *